US009886451B2

(12) United States Patent
Tatebe

(10) Patent No.: US 9,886,451 B2
(45) Date of Patent: Feb. 6, 2018

(54) COMPUTER SYSTEM AND METHOD TO ASSIST ANALYSIS OF ASYNCHRONOUS REMOTE REPLICATION

(71) Applicant: Hitachi, Ltd., Tokyo (JP)

(72) Inventor: Ayako Tatebe, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 322 days.

(21) Appl. No.: 14/427,639

(22) PCT Filed: Apr. 30, 2013

(86) PCT No.: PCT/JP2013/062573
§ 371 (c)(1),
(2) Date: Mar. 12, 2015

(87) PCT Pub. No.: WO2014/178104
PCT Pub. Date: Nov. 6, 2014

(65) Prior Publication Data
US 2015/0248407 A1    Sep. 3, 2015

(51) Int. Cl.
*G06F 17/30* (2006.01)
*G06F 11/20* (2006.01)
*G06F 11/30* (2006.01)
*G06F 11/34* (2006.01)
*G06F 3/06* (2006.01)

(52) U.S. Cl.
CPC ...... *G06F 17/3023* (2013.01); *G06F 11/2074* (2013.01); *G06F 11/3034* (2013.01); *G06F 11/3419* (2013.01); *G06F 11/3433* (2013.01); *G06F 17/30578* (2013.01); *G06F 17/30864* (2013.01); *G06F 3/0653* (2013.01); *G06F 2201/81* (2013.01); *G06F 2201/855* (2013.01)

(58) Field of Classification Search
CPC .................................. G06F 17/30165
USPC .................................. 707/613, 694
See application file for complete search history.

(56) References Cited

U.S. PATENT DOCUMENTS 5,274,805 A * 12/1993 Ferguson .................. G06F 7/24
5,809,224 A *  9/1998 Schultz ................ G06F 3/0626
714/6.32

(Continued)

FOREIGN PATENT DOCUMENTS

JP    2007-128293 A    5/2007
JP    2010-205159 A    9/2010
JP    2012-226703 A    11/2012

OTHER PUBLICATIONS

Storage Virtualization Based Asynchronous Remote Mirror* Xiaojia Xiang et al. 2009 Eighth International Conference on Grid and Cooperative Computing.*

*Primary Examiner* — Polina Peach
*Assistant Examiner* — Ahmed Abraham
(74) *Attorney, Agent, or Firm* — Mattingly & Malur, PC

(57) ABSTRACT

An exemplary management system receives a designation of at least one step selected from a first step of writing data to the secondary volume, a second step of writing data to the secondary journal volume, a third step of reading data from the primary journal volume, and a fourth step of transferring data by the network, and a designation of an analysis period. The management system displays a graph of the history information on the load and the history information of the delay time for the analysis period for the at least one selected step.

10 Claims, 20 Drawing Sheets

(56) References Cited

U.S. PATENT DOCUMENTS

| | | | | |
|---|---|---|---|---|
| 7,398,364 | B2 * | 7/2008 | Maruyama | G06F 3/0613 707/999.202 |
| 8,286,030 | B1 * | 10/2012 | Chatterjee | G06F 17/30008 707/674 |
| 2002/0198899 | A1 * | 12/2002 | Yamaguchi | G06F 17/30575 |
| 2003/0103055 | A1 * | 6/2003 | DaSilva | G08B 13/19686 345/536 |
| 2006/0277384 | A1 * | 12/2006 | Yagawa | G06F 11/3428 711/170 |
| 2006/0282637 | A1 * | 12/2006 | Yamauchi | G06F 3/0605 711/170 |
| 2007/0022135 | A1 * | 1/2007 | Malik | G06F 17/30876 |
| 2010/0228888 | A1 * | 9/2010 | Uchi | G06F 3/0605 710/10 |
| 2010/0268987 | A1 * | 10/2010 | Clark | G06F 9/3867 714/16 |
| 2011/0010496 | A1 * | 1/2011 | Kirstenpfad | G06F 17/30067 711/114 |
| 2011/0066801 | A1 * | 3/2011 | Sato | G06F 3/0605 711/114 |
| 2013/0097480 | A1 * | 4/2013 | Allison | G06Q 10/10 715/223 |
| 2013/0151738 | A1 * | 6/2013 | Uchi | G06F 3/0605 710/18 |
| 2013/0290274 | A1 * | 10/2013 | Patil | G06F 17/30156 707/690 |
| 2016/0034476 | A1 * | 2/2016 | Matsubara | G06F 11/1448 707/694 |

\* cited by examiner

COPY PAIR INFORMATION TABLE 150

| COPY PAIR 151 | COPY GROUP 152 | PRIMARY STORAGE APPARATUS 153 | SECONDARY STORAGE APPARATUS 154 | PRIMARY JOURNAL VOLUME 155 | SECONDARY JOURNAL VOLUME 156 | PRIMARY VOLUME 157 | SECONDARY VOLUME 158 |
|---|---|---|---|---|---|---|---|
| PAIR_001 | CG_1 | STORAGE A | STORAGE C | JOURNAL_1 | JOURNAL_3 | VOLUME_1 | VOLUME_6 |
| PAIR_002 | CG_1 | STORAGE A | STORAGE C | JOURNAL_1 | JOURNAL_3 | VOLUME_2 | VOLUME_7 |
| PAIR_003 | CG_1 | STORAGE A | STORAGE C | JOURNAL_1 | JOURNAL_3 | VOLUME_3 | VOLUME_8 |
| PAIR_004 | CG_2 | STORAGE B | STORAGE D | JOURNAL_2 | JOURNAL_4 | VOLUME_4 | VOLUME_9 |
| PAIR_005 | CG_2 | STORAGE B | STORAGE D | JOURNAL_2 | JOURNAL_4 | VOLUME_5 | VOLUME_10 |
| .. | .. | .. | .. | .. | .. | .. | .. |

*FIG. 3*

JOURNAL VOLUME INFORMATION TABLE ~160

| JOURNAL VOLUME ~161 | STORAGE APPARATUS ~162 | RELATED PROCESSOR ~163 | RELATED CACHE ~164 |
|---|---|---|---|
| JOURNAL_1 | STORAGE A | PROCESSOR_1 | CACHE_1 |
| JOURNAL_2 | STORAGE B | PROCESSOR_2 | CACHE_2 |
| : | : | : | : |

*FIG. 4*

VOLUME INFORMATION TABLE ~170

| VOLUME ~171 | STORAGE APPARATUS ~172 | RELATED PROCESSOR ~173 | RELATED CACHE ~174 |
|---|---|---|---|
| VOLUME_1 | STORAGE A | PROCESSOR_5 | CACHE_5 |
| VOLUME_2 | STORAGE A | PROCESSOR_5 | CACHE_5 |
| VOLUME_3 | STORAGE A | PROCESSOR_5 | CACHE_5 |
| VOLUME_4 | STORAGE B | PROCESSOR_6 | CACHE_6 |
| VOLUME_5 | STORAGE B | PROCESSOR_6 | CACHE_6 |
| : | : | : | : |

*FIG. 5*

NETWORK INFORMATION TABLE ~180

| REMOTE PATH ~181 | PRIMARY STORAGE APPARATUS ~182 | COPY GROUP ~183 |
|---|---|---|
| PATH_1 | STORAGE A | CG_1, CG_5 |
| PATH_2 | STORAGE B | CG_2 |
| : | : | : |

*FIG. 6*

PORT INFORMATION TABLE ~190

| PORT ~191 | STORAGE APPARATUS ~192 | RELATED REMOTE PATH ~193 |
|---|---|---|
| Port_1 | STORAGE A | PATH_1 |
| Port_2 | STORAGE B | PATH_2 |
| Port_3 | STORAGE B | PATH_2 |
| : | : | : |

*FIG. 7*

PROCESSOR INFORMATION TABLE ~250

| PROCESSOR ~251 | STORAGE APPARATUS ~252 |
|---|---|
| PROCESSOR_1 | STORAGE A |
| PROCESSOR_2 | STORAGE B |
| PROCESSOR_3 | STORAGE B |
| : | : |

*FIG. 8*

CACHE INFORMATION TABLE ~260

| CACHE ~261 | STORAGE APPARATUS ~262 |
|---|---|
| CACHE_1 | STORAGE A |
| CACHE_2 | STORAGE B |
| CACHE_3 | STORAGE B |
| : | : |

*FIG. 9*

270 JOURNAL VOLUME LOAD HISTORY INFORMATION TABLE

| TIME POINT (271) | JOURNAL VOLUME (272) | UTILIZATION RATE (%) (273) |
|---|---|---|
| T1 | JOURNAL_1 | 10 |
| T1 | JOURNAL_2 | 10 |
| T2 | JOURNAL_1 | 15 |
| T2 | JOURNAL_2 | 10 |
| : | : | : |

FIG. 10

280 VOLUME LOAD HISTORY INFORMATION TABLE

| TIME POINT (281) | VOLUME (282) | WRITE TRANSFER RATE (MB/Sec) (283) |
|---|---|---|
| T1 | VOLUME_1 | 20 |
| T1 | VOLUME_2 | 20 |
| T2 | VOLUME_1 | 30 |
| T2 | VOLUME_2 | 10 |
| : | : | : |

FIG. 11

290 PORT LOAD HISTORY INFORMATION TABLE

| TIME POINT (291) | PORT (292) | PORT TRANSFER RATE (MB/Sec) (293) |
|---|---|---|
| T1 | Port_1 | 30 |
| T1 | Port_2 | 40 |
| T1 | Port_3 | 20 |
| T2 | Port_1 | 10 |
| T2 | Port_2 | 30 |
| T2 | Port_3 | 20 |
| : | : | : |

FIG. 12

350
| PROCESSOR LOAD HISTORY INFORMATION TABLE | | |
|---|---|---|
| 351 | 352 | 353 |
| TIME POINT | PROCESSOR | OPERATING RATE (%) |
| T1 | PROCESSOR_1 | 50 |
| T1 | PROCESSOR_2 | 20 |
| T2 | PROCESSOR_1 | 30 |
| T2 | PROCESSOR_2 | 30 |
| : | : | : |

FIG. 13

360
| CACHE LOAD HISTORY INFORMATION TABLE | | |
|---|---|---|
| 361 | 362 | 363 |
| TIME POINT | CACHE | WRITE DELAY PROBABILITY (%) |
| T1 | CACHE_1 | 20 |
| T1 | CACHE_2 | 30 |
| T2 | CACHE_1 | 30 |
| T2 | CACHE_2 | 20 |
| : | : | : |

FIG. 14

370
| DELAY TIME HISTORY INFORMATION TABLE | | |
|---|---|---|
| 371 | 372 | 373 |
| TIME POINT | COPY GROUP | DELAY TIME (Sec) |
| T1 | CG1 | 10 |
| T1 | CG2 | 5 |
| T2 | CG1 | 5 |
| T2 | CG2 | 20 |
| : | : | : |

FIG. 15

| LIST OF MEASURED VALUES TO BE DISPLAYED | | | |
|---|---|---|---|
| STEPS | METRICS | | |
| WRITING TO SECONDARY VOLUME | CACHE WRITE DELAY PROBABILITY | PROCESSOR OPERATING RATE | |
| WRITING TO SECONDARY JOURNAL VOLUME | CACHE WRITE DELAY PROBABILITY | PROCESSOR OPERATING RATE | SECONDARY JOURNAL VOLUME UTILIZATION RATE |
| READING FROM PRIMARY JOURNAL VOLUME | PROCESSOR OPERATING RATE | PRIMARY JOURNAL VOLUME UTILIZATION RATE | |
| DATA TRANSFER BY REMOTE PATH | REMOTE PATH TRANSFER RATE | WRITE TRANSFER RATE | |

*FIG. 16*

2500 — ANALYSIS RESULT

ANALYSIS SUBJECT SUMMARY — 2501
- ANALYSIS SUBJECT GROUP: COPY GROUP X
- ANALYSIS PERIOD: 20XX/XX/XX/XX:XX ~ 20YY/YY/YY/YY:YY

ANALYSIS RESULT SUMMARY — 2502

| NUMBER OF DETECTED PROBLEMS | | |
|---|---|---|
| WRITING TO SECONDARY VOLUME | | 0 |
| WRITING TO SECONDARY JOURNAL VOLUME | | 1 |
| READING FROM PRIMARY JOURNAL VOLUME | | 1 |
| NETWORK | | 0 |

2503

READING FROM PRIMARY JOURNAL VOLUME (1)

| CAUSE | COUNTERMEASURE |
|---|---|
| THE CAPACITY OF THE PROCESSOR IS INSUFFICIENT WITH RESPECT TO THE LOAD. THERE IS A POSSIBILITY THAT A WRITE EXCEEDING THE EXPECTED CAPACITY OF THE SYSTEM DESIGN HAS BEEN ISSUED WITH RESPECT TO ANOTHER VOLUME WHICH SHARES A COPY GROUP OR A PROCESSOR. | PLEASE CHECK TO SEE IF THE PROCESSOR IS BEING SHARED WITH ANOTHER VOLUME. WHEN THE PROCESSOR IS BEING SHARED: PLEASE CONSIDER ALLOCATING ANOTHER PROCESSOR TO THE VOLUME WHICH IS ALREADY ALLOCATED TO THE PROCESSOR, OR ALLOCATING A PROCESSOR WITH A LOW OPERATING RATE TO THE JOURNAL VOLUME. WHEN THE PROCESSOR IS NOT BEING SHARED, OR WHEN THE VOLUME SHARING THE PROCESSOR IS LOW IN THE UTILIZATION RATE: PLEASE CONSIDER DIVIDING THE MANAGING COPY GROUP INTO MULTIPLE COPY GROUPS, AND ALLOCATING EACH DIVIDED COPY GROUP TO SEPARATE PROCESSORS. |

NETWORK (0)

| CAUSE | COUNTERMEASURE |
|---|---|
| | |

*FIG. 25*

CAUSE – COUNTERMEASURE MAPPING INFORMATION TABLE /390

| STEPS /391 | MARKED METRIC /392 | CAUSE /393 | COUNTERMEASURE /394 |
|---|---|---|---|
| WRITING TO SECONDARY VOLUME | PROCESSOR OPERATING RATE ≧ THRESHOLD WRITE DELAY PROBABILITY ≧ THRESHOLD | HIGH LOAD ON PROCESSOR | CHANGE PROCESSOR ALLOCATION, CHANGE PROCESSOR |
| WRITING TO SECONDARY VOLUME | WRITE DELAY PROBABILITY ≧ THRESHOLD | 1. HIGH LOAD ON RAID GROUP 2. INSUFFICIENT CACHE CAPACITY | 1. CHANGE RAID GROUP ALLOCATION 2. CHANGE CACHE ALLOCATION, CHANGE CACHE |
| WRITING TO SECONDARY JOURNAL VOLUME | PROCESSOR OPERATING RATE ≧ THRESHOLD WRITE DELAY PROBABILITY ≧ THRESHOLD | HIGH LOAD ON PROCESSOR | CHANGE PROCESSOR ALLOCATION, CHANGE PROCESSOR |
| WRITING TO SECONDARY JOURNAL VOLUME | WRITE DELAY PROBABILITY ≧ THRESHOLD | 1. HIGH LOAD ON RAID GROUP 2. INSUFFICIENT CACHE CAPACITY | 1. CHANGE RAID GROUP ALLOCATION 2. CHANGE CACHE ALLOCATION, CHANGE CACHE |
| READING FROM PRIMARY JOURNAL VOLUME | PROCESSOR OPERATING RATE ≧ THRESHOLD | HIGH LOAD ON PROCESSOR | CHANGE PROCESSOR ALLOCATION, CHANGE PROCESSOR |
| TRANSFER BY REMOTE PATH | TRANSFER RATE ≧ MAXIMUM BANDWIDTH | INCREASE OF HOST I/O | CHANGE LINE NUMBER FOR REMOTE PATH, CHANGE REMOTE PATH ALLOCATION |
| TRANSFER BY REMOTE PATH | TRANSFER RATE < MAXIMUM BANDWIDTH | FAILURE AT REMOTE PATH | CONFIRM REMOTE PATH STATUS |

FIG. 26

COMPUTER SYSTEM AND METHOD TO ASSIST ANALYSIS OF ASYNCHRONOUS REMOTE REPLICATION

BACKGROUND

The present invention is related to a computer system and a method to assist an analysis of asynchronous remote replication.

Business can be affected greatly when an operation is suspended or a data loss occurs due to an occurrence of an IT system down. Disaster recovery (DR) as a preparation for unforeseeable events such as natural disasters is vital. A DR system is operable to duplicate data from a primary site to a secondary site at a remote location in an asynchronous manner. This is referred to as an asynchronous remote replication.

A synchronous remote replication notifies a host with a completion of a write after a completion of data replication to a storage apparatus (secondary storage apparatus) at a secondary site concerning a write access from the host to a storage apparatus (primary storage apparatus) at a primary site. When the completion of a write is notified, data at the primary site and that at the secondary site are matched.

On the other hand, the asynchronous remote replication notifies a host with a completion of a write when data writing to a primary storage apparatus is completed without waiting for the replication of the data at the secondary storage apparatus. In an environment where the asynchronous remote replication is used, a phenomenon where a delay occurs between the storing of data at the primary storage apparatus and the replicating of the data at the secondary storage apparatus causing the data at the secondary storage apparatus to be older than the data at the primary storage apparatus may occur.

An index for a maximum allowable time of data that is lost when a system at the primary site is down is referred to as RPO (Recovery Point Objective: Target Recovery Point). Further, an index for an amount of time needed for a system which is down to recover is referred to as RTO (Recovery Time Objective: Target Recovery Time).

These index values are linked to the survival of a business entity and are thus considered noteworthy as an SLA (Service Level Agreement). It is important that the asynchronous remote replication satisfies the demand with respect to the above mentioned index for the SLA.

The asynchronous remote replication appropriately transfers data from a primary storage apparatus to a secondary storage apparatus in an asynchronous manner by using, for example, an order guaranteeing technology of data. A delay time between a writing to the primary storage apparatus and that to the secondary storage apparatus changes depending on a load on a system which changes with time. For example, Patent Document 1 discloses a calculation method of a delay time concerning the asynchronous remote replication.

An example of a delay time will be described. A host writes data to a primary storage apparatus. The primary storage apparatus writes the data received from the host to a primary volume. The primary storage apparatus transfers the data from the host to a secondary storage apparatus. When transferring data, both the primary storage apparatus and the secondary storage apparatus temporarily store the data at a volume which is referred to as a journal volume.

For example, suppose that data, which is written to the primary storage apparatus at 8:00, is written to the secondary storage apparatus at 8:08. The delay time here is 8 minutes. Further, in this case, recoverable data as of 8:08 is the data written to the primary storage apparatus up until 8:00 (data recovery available time is 8:00). Accordingly, in the asynchronous remote replication, a delay occurs in writing data to the secondary storage apparatus with respect to data writing to the primary storage apparatus.

Patent Document 1: US 2006/0277384 A1

SUMMARY

In an asynchronous remote replication system, it is desirable that a delay time, which is an index indicating a point in time until which data is replicated at the secondary storage when a failure takes place at the primary site, is reduced to minimum. Further, it is desirable to be able to easily investigate in a small amount of time the cause when the delay is extended.

The asynchronous remote replication replicates data from the primary volume to a secondary volume via a primary journal volume and a secondary journal volume. Therefore, the asynchronous remote replication is characterized in that a delay, which occurs at a latter step relating to writing/reading, spreads to a step prior thereto.

In order to identify a cause for an increase in delay time, it is necessary for a user to acquire information concerning a history of loads on a physical resource and information concerning a history of delay times related to the asynchronous remote replication, and analyze the correlation of the same. However, when the user is to independently acquire and analyze said information, it requires a large amount of time before identifying the cause for the increase in delay time. Therefore, a technology operable to appropriately assist a user in performing an analysis on delay time regarding the asynchronous remote replication is desired.

An aspect of the present invention is a computer system including a management system, a primary storage apparatus including a primary volume and a primary journal volume, a secondary storage apparatus, communicating via a network with the primary storage apparatus, and including a secondary volume and a secondary journal volume. The primary storage apparatus writes replicated data of data stored at the primary volume to the primary journal volume. The primary storage apparatus reads the data from the primary journal volume, and outputs the data to the network. The secondary storage apparatus writes the data received from the network to the secondary journal volume via a cache. The secondary storage apparatus writes the data read from the secondary journal volume to the secondary volume via a cache. The management system receives a designation of at least one step selected from a first step of writing data to the secondary volume, a second step of writing data to the secondary journal volume, a third step of reading data from the primary journal volume, and a fourth step of transferring data by the network, and a designation of an analysis period. The management system acquires history information of a load on a resource corresponding to the at least one selected step for the analysis period, and history information of a delay time related to a data replication conducted between the primary storage apparatus and the secondary storage apparatus for the analysis period. The management system displays a graph of the history information on the load and the history information of the delay time for the analysis period for the at least one selected step.

According to one embodiment of the present invention, it is possible to appropriately assist a user in performing an analysis on delay time regarding the asynchronous remote replication.

BRIEF DESCRIPTION OF THE DRAWINGS

FIG. 3 illustrates an example of a configuration of a copy pair information table which stores copy pair information.

FIG. 4 illustrates an example of a configuration of a journal volume information table which stores information concerning journal volume.

FIG. 5 illustrates an example of a configuration of a volume information table which stores data volume information.

FIG. 6 illustrates an example of a configuration of a network information table of an inter storage apparatuses.

FIG. 7 illustrates an example of a configuration of a port information table.

FIG. 8 illustrates an example of a configuration of a processor information table.

FIG. 9 illustrates an example of a configuration of a cache information table.

FIG. 10 illustrates an example of a configuration of a journal volume load history information table.

FIG. 11 illustrates an example of a configuration of a volume load history information table.

FIG. 12 illustrates an example of a configuration of a port load history information table.

FIG. 13 illustrates an example of a configuration of a processor load history information table.

FIG. 14 illustrates an example of a configuration of a cache load history information table.

FIG. 15 illustrates an example of a configuration of a delay time history information table.

FIG. 16 illustrates four steps concerning the asynchronous remote replication and metrics (load on physical resource) a graph is operable to display for each step.

FIG. 25 illustrates an example of an analysis result image by a delay time analysis program.

FIG. 26 illustrates an example of a configuration of a mapping table which is referred in an analysis by the delay time analysis program utilizing the wizard.

DETAILED DESCRIPTION OF THE EMBODIMENTS

Hereinafter, embodiments of this invention are described with reference to the accompanying drawings. It should be noted that the embodiments are merely examples to realize this invention and are not to limit the technical scope of this invention. Throughout the drawings, elements common to some drawings are denoted by the same reference signs unless particularly mentioned.

A present embodiment discloses a system and method which assists a user in analyzing an asynchronous remote replication, which is carried out by a storage system. A system according to the present embodiment collects the history information of delay time of the asynchronous remote replication and the history information of the load on a physical resource related to the asynchronous remote replication, and displays the multiple history information on a single analytic graph. By this, a user is operable to visually grasp a cause and effect relationship between a change in the delay time and the change in the load on the related physical resource.

The system according to the present embodiment breaks the asynchronous remote replication into a plurality of steps, and prepares an analytic graph for each step. By this, the user is operable to more easily identify a cause for the increase in delay time. The system accepts, from the user, an option concerning steps of displaying the analytic graph, and a specification on a duration of history to be displayed by the analytic graph, and displays an analytic graph of at least one step. By this, it becomes possible to display an analytic graph which makes it easy for the user to perform the analysis in accordance with a user environment and/or operation method.

Figure 1A:
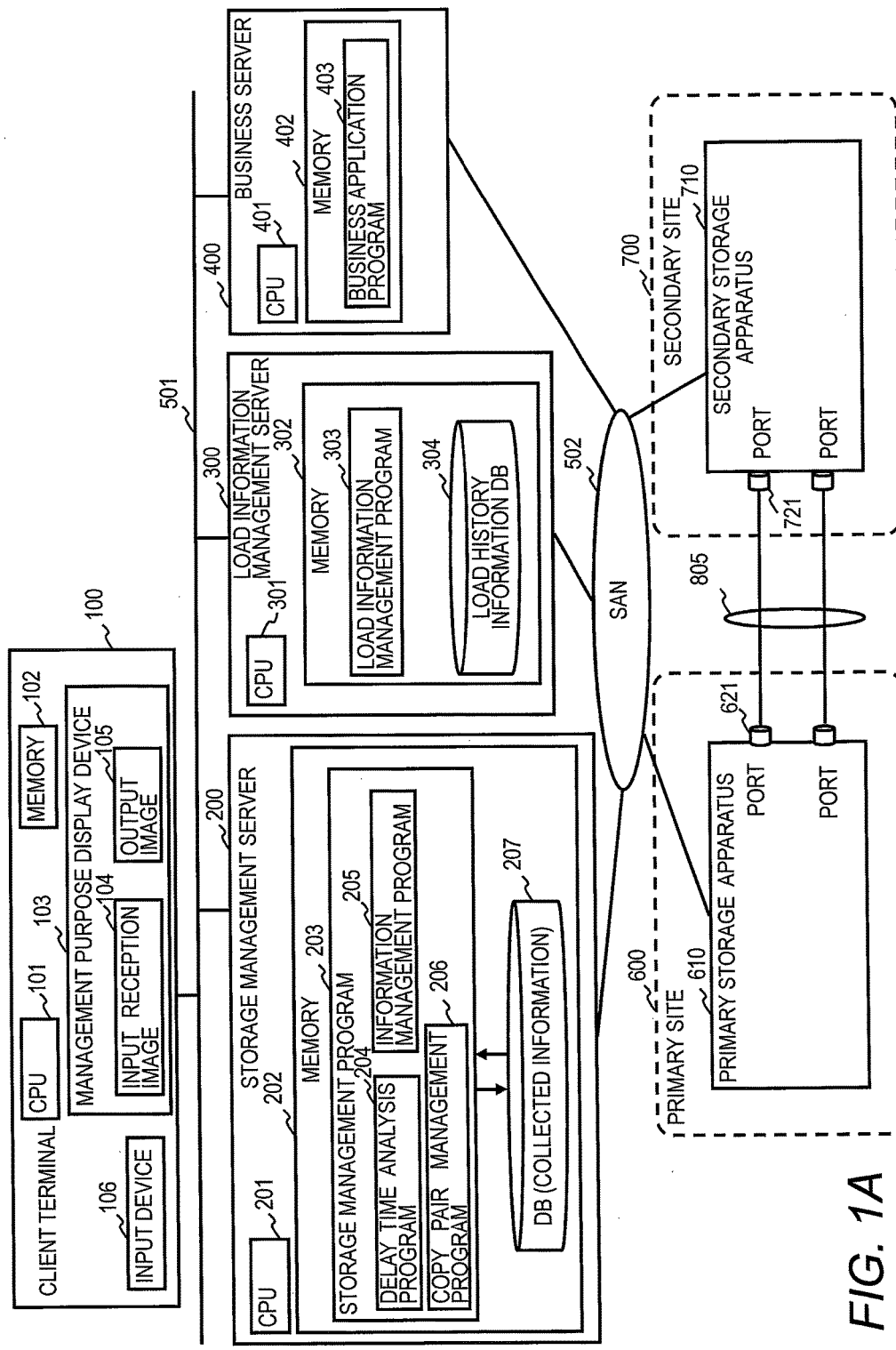
FIG. 1A illustrates a block diagram of an example of a configuration of a computer system.

FIG. 1A is a block diagram illustrating an example of a configuration of a computer system according to the present embodiment. The computer system includes an asynchronous remote replication system and a business server 400. The asynchronous remote replication system includes a client terminal 100, a storage management server 200, a load information management server 300, and storage apparatuses 610, 710. The number for each of these apparatuses depends on the design of the system. The client terminal 100, the storage management server 200, and the load information management server 300 make up a management system. One computer may also make up the management system.

A primary storage apparatus 610 and a secondary storage apparatus 710 are installed at a primary site 600 and a secondary site 700, respectively. The storage apparatuses 610 and 710 include an asynchronous remote replication function from the primary storage apparatus 610 to the secondary storage apparatus 710. The secondary site 700 is located physically apart from the primary site 600 such that when the primary storage apparatus 610 is damaged, data which is replicated (arranged as a backup) to the secondary storage apparatus 710 is used.

For convenience of description, in an example of FIG. 1A, data from a primary volume (also referred to as primary data volume) of the storage apparatus 610 is replicated to a secondary volume (also referred to as secondary data volume) of the storage apparatus 710.

However, data from the primary volume of the storage apparatus 710 may be replicated to the secondary volume of the storage apparatus 610. From a standpoint of one copy pair, the storage apparatus which stores the primary volume is the primary storage apparatus, while the storage apparatus which stores the secondary volume is the secondary storage apparatus. The same also applies to the primary site and the secondary site.

The storage management server 200, the load information management server 300, the business server 400, and the storage apparatuses 610 and 710 are connected via a data network 502. The data network 502 is a data communication network, and is, according to the current configuration, an SAN (Storage Area Network). The data network 502 may be other than the SAN as long as the data network 502 is a data communication network, such as an IP network.

The client server 100, the storage management server 200, the load information management server 300, and the business server 400 are connected via a management network 501. The management network 501 is, according to the current configuration, an IP network. The management network 501 may be other than IP network as long as the management network 501 is a management data communication network, such as the SAN network. The data network 502 and the management network 501 may be the same network.

The business server 400 is a server to perform businesses of a user, and includes, besides a processor (noted as CPU in FIG. 1A) 401 and a memory 402, a nonvolatile secondary storage apparatus (unillustrated) and a storage interface (I/F) (unillustrated) as well as a management I/F (unillustrated), which are connected to one another. The processor 401 operates in accordance with a program stored at the memory 402. Programs and data which are stored at the secondary storage apparatus are loaded to the memory 402. The storage I/F is connected to the data network 502, while the management I/F is connected to the management network 501.

A business application program 403, which is used for the businesses of a user, operates at the business server 400. The business server 400 is operable to access the storage apparatuses 610 and 710 via the network 502. For example, the business server 400 normally accesses (broader term for reading and writing) the volume of the primary storage apparatus 610, or accesses the secondary storage apparatus 710 when the business server 400 is unable to access the primary storage apparatus 610.

The client server 100 is a terminal arranged for an administrator (user) to manage the storage system. The client server 100 includes a processor (CPU) 101, which operates in accordance with a program, a memory 102, which stores the program, a management purpose display device 103, and an input device 106, as well as an IF which is connected to a nonvolatile secondary storage apparatus and a management network 501, which are not illustrated.

The administrator uses a user interface of the client server 100 to manage the system. The administrator uses the client server 100 to communicate via the management network 501 with the storage management server 200 and other apparatuses.

The management purpose display device 103 is typically a liquid crystal display apparatus, while the input device 106 is typically a keyboard and a mouse. The administrator is operable to acquire necessary information from the management purpose display device 103, and input necessary information via the input device 106. The management purpose display device 103 displays an input reception image 104 and an output image 105, which are arranged to perform thereon each type of operation by a storage management program 203, for example. The client server 100 uses a GUI program, such as a browser program, to provide the administrator with a GUI. As for a program to be used, any program may be used.

The load information management server 300 is a server computer arranged to collect and manage the load information of various physical resources at the storage system which includes the storage apparatuses 610 and 710. The load information management server 300 includes, besides a processor (CPU) 301, and a memory 302, a nonvolatile secondary storage apparatus, a storage I/F and a management I/F, which are unillustrated and are connected to one another. The processor 301 operates in accordance with a program stored at the memory 302. Programs and data which are stored at the secondary storage apparatus are loaded to the memory 302.

According to FIG. 1A, the memory 302 stores a load information management program 303 and a load history information database (DB) 304. The load information management program 303 collects the load information of the resource from the storage apparatuses 610 and 710 via the SAN 502 in a sequential manner. The load history information DB 304 stores the load history information collected from the load information management program 303.

The collected load information includes, for example, an operating rate of the processor, a write transfer rate from the business server 400, an IOPS, a response time, a write time delay probability of a cache write, a transfer rate of a port, a utilization rate of a volume, and a utilization rate of a cache, or the like. The load information management program 303 transmits the collected load history information in accordance with a request from the storage management server 200.

The storage management server 200 is a server computer arranged to manage the storage apparatuses 610 and 710. The storage management server 200 includes, besides a processor (CPU) 201 and a memory 202, a nonvolatile secondary storage apparatus as well as a storage I/F and a management I/F, which are unillustrated and are connected to one another. The processor 201 operates in accordance with a program stored at the memory 202. Programs and data which are stored at the secondary storage apparatus are loaded to the memory 202.

According to FIG. 1A, the memory 202 stores the storage management program 203 and a DB 207. The storage management program 203 executes each type of operation based on an instruction from the administrator using the client server 100. The storage management program 203 is a program arranged to manage the storage apparatuses 610 and 710. The storage management program 203 includes a delay time analysis program 204, an information management program 205, and a copy pair management program 206.

The copy pair management program 206 controls and manages a copy pair of the storage system (storage apparatuses 610 and 710). The copy pair management program 206 communicates, in accordance with a request from the client server 100, with the storage apparatuses 610 and 710 via the SAN 502, and carries out an operation such as creating, deleting, and changing a status of a copy pair at the storage apparatuses 610 and 710. The copy pair management program 206 includes management information for managing copy pairs.

A copy pair is a pair of volumes including a volume (primary volume) from the storage apparatus 610 and a volume (secondary volume) from the storage apparatus 710. Note that one primary volume may configure a pair with one secondary volume, or one primary volume may configure a plurality of pairs with a plurality of secondary volumes.

The copy pair management program 206 generates a GUI image from the information the copy pair management program 206 includes and the information concerning a copy pair configuration collected from the control program of the storage apparatuses 610 and 710, and transmits the same to the client server 100. A delay time in the asynchronous remote replication, which will be described below, is calculated by the copy pair management program 206.

The information management program 205 collects information necessary for the asynchronous remote replication analysis according to the present embodiment from the storage apparatuses 610 and 710 via the SAN 501 and the load information management server 300 via the management network 501. The information management program 205 further collects necessary information from the copy pair management program 206. The information management program 205 stores the collected information at the DB 207 of the storage management server 200. Information, which is stored at the DB 207, will be described below.

The delay time analysis program 204 generates a GUI image for the administrator to perform the analysis on delay time in the asynchronous remote replication, and provides the same to the administrator. The delay time analysis program 204 generates a graph indicating a correlation between a time change of a delay time at each of a plurality of steps for the asynchronous remote replication and a time change of a resource load, and provides the same to the administrator using the client server 100. By this, the delay time analysis performed by the administrator is assisted.

The delay time analysis program 204 further provides a wizard GUI for the delay time analysis. The delay time analysis program 204 receives an input from the administrator regarding the graph which indicates the correlation between the time changes of the delay time at each of the plurality of steps and the resource load, and provides, in accordance with the information inputted from the administrator, a guideline concerning an estimated result of the cause for the increase in the delay time as well as a measure thereagainst. By this, it becomes possible to more effectively assist the delay time analysis performed by the administrator. Details concerning the operations of the delay time analysis program 204 will be described below.

The storage apparatuses 610 and 710 communicate with one another via one or a plurality of remote paths (inter storage network) 805. In particular, asynchronous replication data is transmitted from the remote path 805. The storage apparatus 610 is connected to the remote path 805 via a port 621, while the storage apparatus 710 is connected to the same via a port 721. One remote path 805 is operable to include one or a plurality of port pairs (one of a plurality of communication lines).

Figure 1B:
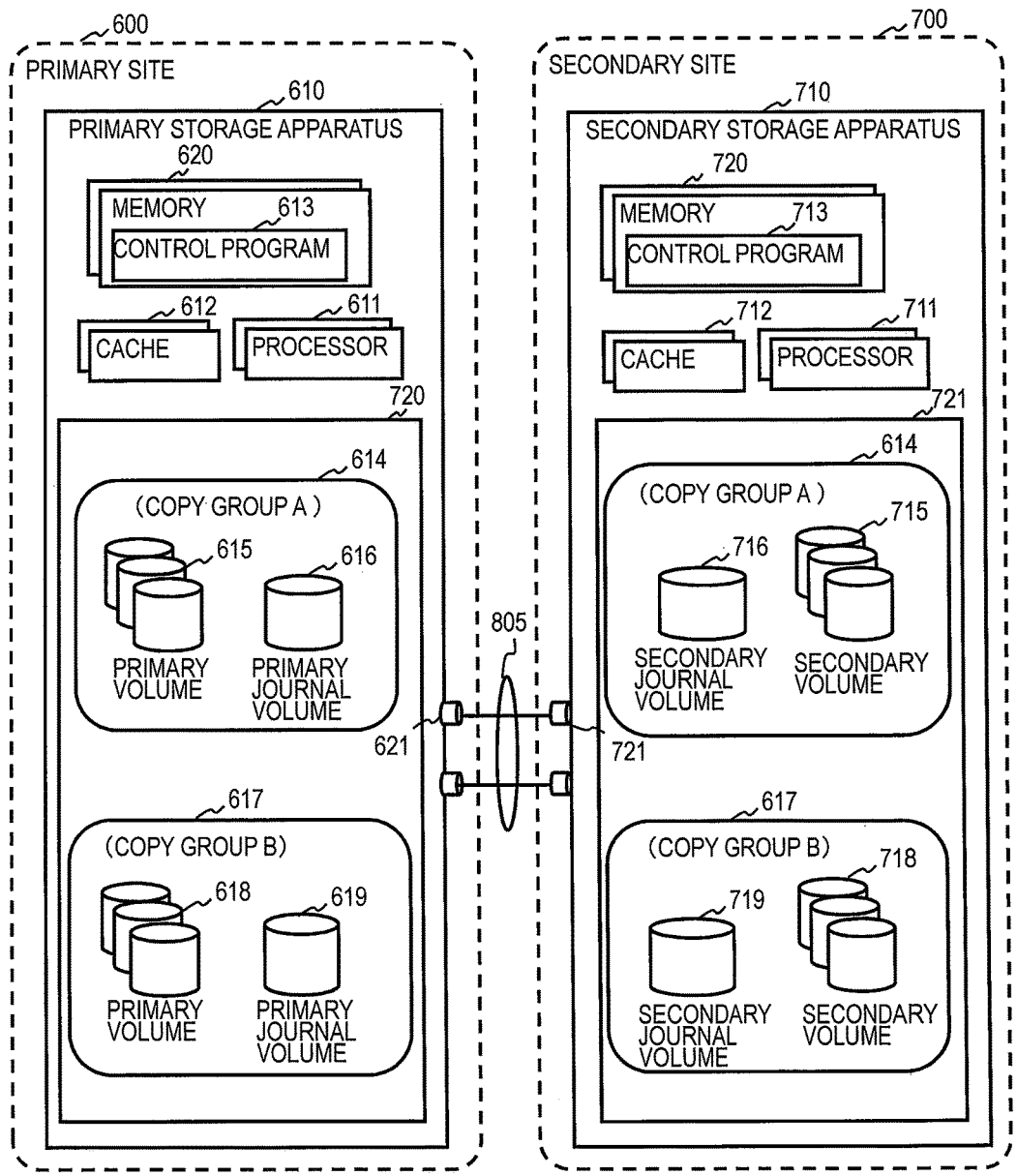
FIG. 1B illustrates a block diagram of an example of a configuration of a storage apparatus of the computer system.

FIG. 1B schematically illustrates an example of a configuration of the storage system which includes the storage apparatuses 610 and 710 which are connected via the network. The primary storage apparatus 610 includes, besides a plurality of processors 611, a plurality of caches 612, a plurality of memories 620, and a group of nonvolatile storage drives 720, a plurality of Ifs, which are unillustrated. Each processor 611, each cache 612, and each memory 620 are physical resources that are logically divided.

For example, one processor is configured with one or a plurality of processor chips, or a portion of one or a plurality of time divisioned processor chips. One cache includes, for example, one or a plurality of memory chips, or may be a portion of one or a plurality of memory chips. A storage area of one cache may be managed by a consecutive address. A boundary of a physical resource, which is logically divided, does not necessarily coincide with a boundary of a chip. Since logical division of physical resources is a widely known technology, the description thereof will, be omitted.

In the similar manner, the secondary storage apparatus 710 includes, besides a plurality of processors 711, a plurality of caches 712, a plurality of memories 720, and a group of nonvolatile storage drives 721, a plurality of Ifs, which are unillustrated. Each processor 711, each cache 712, and each memory 720 are physical resources that are logically divided.

The storage apparatuses 610 and 710 operate in accordance with control programs 613 and 713. The control program 613 and 713 include a plurality of modules where each module is stored at the memories 620 and 720 which are allocated to the processors 611 and 711, which execute the modules.

According to an example of FIG. 1B, the storage apparatuses 610 and 710 include two copy groups, 614 and 617. A copy group is a group having one or a plurality of copy pairs and one or a plurality of either primary or secondary journal volumes. The administrator includes copy pairs, for which consistency therebetween is desired, in the same copy group.

The primary storage apparatus 610 includes a plurality of primary volumes 615 and one primary journal volume 616 which are included in a copy group A 614. Further, the primary storage apparatus 610 includes a plurality of primary volumes 618 and one primary journal volume 619 which are included in a copy group B 617. The number of primary volume to be included in one copy group may be one, while multiple primary journal volumes may be included in one copy group.

The primary volumes 615 and 618 are logical volume which are logical storage area recognizable to the business server 400 and the management servers 200 and 300. The primary journal volumes 616 and 619 each are logical storage area at which updated data written to the primary volumes 615 and 618 are stored temporarily.

For example, a plurality of storage drives (device including a nonvolatile storage medium) at the storage drive group 720 configure a RAID (Redundant Arrays of Independent Disks) group, where a portion of the storage area of the RAID group is allocated to one volume. The same applies to the secondary storage apparatus 710. The storage drive is, for example, a hard disk drive, or an SSD (Solid State Drive).

The secondary storage apparatus 710 includes a plurality of secondary volumes 715 and one secondary journal volume 716 which are included in the copy group A 614. Further, the secondary storage apparatus 710 includes a plurality of secondary volumes 718 and one secondary journal volume 719 which are included in the copy group B 617. The number of secondary volumes to be included in a copy group may be one, while multiple secondary journal volumes may be included in one copy group.

The secondary volumes 715 and 718 are logical volume which are logical storage area recognizable to the business server 400 and the management servers 200 and 300. The secondary journal volumes 716 and 719 each are logical storage area at which updated data written to the secondary volumes 715 and 718 are stored temporarily.

The primary storage apparatus 610 and the secondary storage apparatus 710 are communicatably connected to one another via the inter storage network (remote path) 850. The primary storage apparatus 610 and the secondary storage apparatus 710 carry out the asynchronous remote replication of volumes. The asynchronous remote replication notifies the business server 400 with a data write completion notice after a data write to the cache or the primary volume of the primary storage apparatus 610 and before the completion of the data write to the secondary volume.

Figure 2:
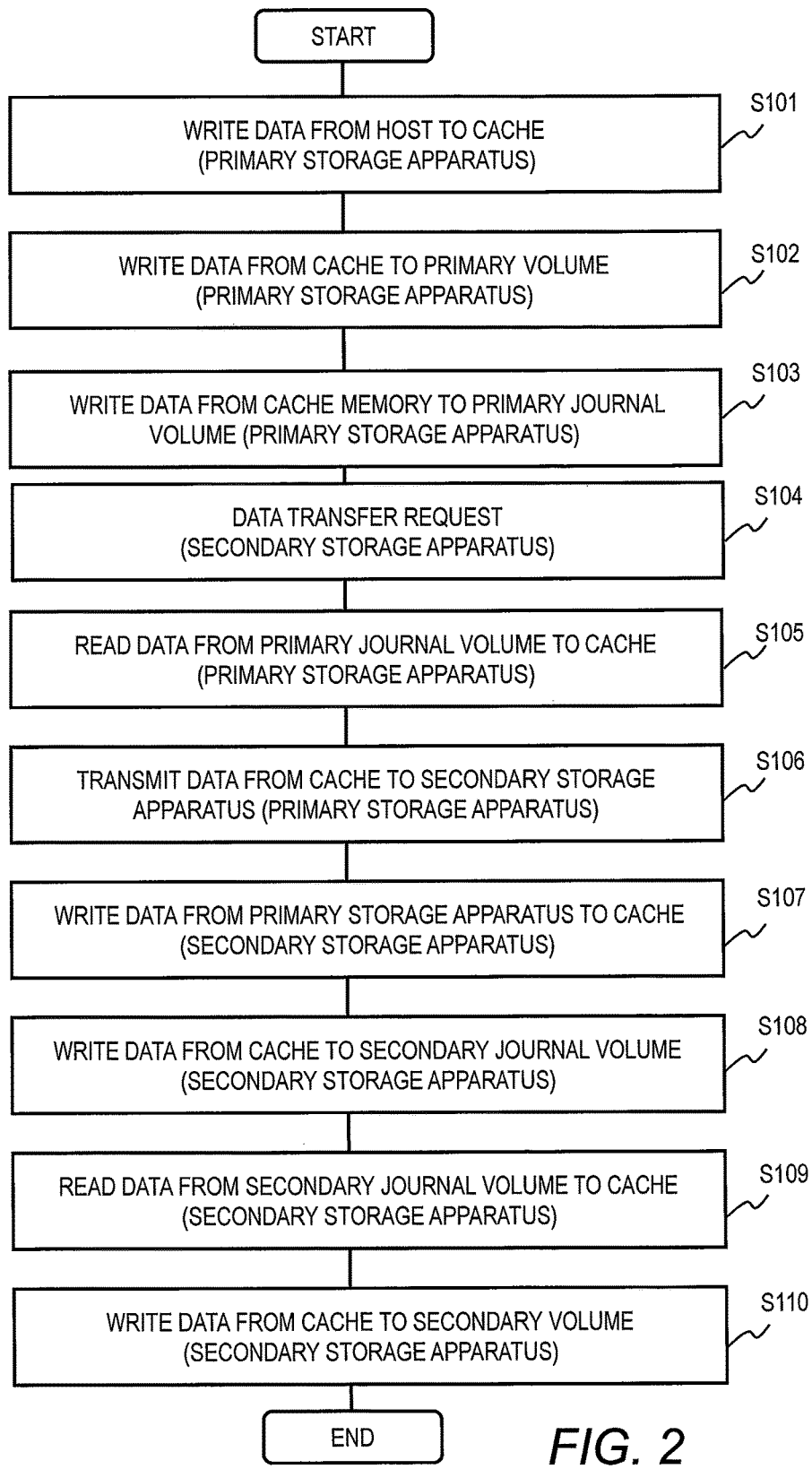
FIG. 2 illustrates a flowchart of an example of an asynchronous remote replication proceeding with writing data to a primary volume.

An example of the asynchronous replication according to the present embodiment which is the subject of the analysis performed by the administrator will be described. As an example, an example of the asynchronous remote replication corresponding to a data write to the primary volume 615 will be described with reference to a flowchart in FIG. 2. Note that in the following description, a processor and a cache are allocated to each of the primary and secondary data volumes and the primary and secondary journal volumes.

The primary storage apparatus 610 receives a write command and a write data to the primary volume 615 from the business server 400 via the SAN 502. The control program 613 of the primary storage apparatus 610 writes the received data to the caches 612 which is allocated to the primary volume 615 (S101).

The processor 611 which is allocated to the primary volume 615 writes the data in the cache 612 to the primary volume 615 in accordance with the control program 613 (S102). The processor 611 which is allocated to the primary volume 616 writes the data in the cache 612 to the primary journal volume 616 (S102). Note that in the present specification, an entry stored at the primary journal volume 616 will be referred to as a journal. The journal includes, besides user data and address information, a sequential number which is an identifier thereof.

The control program 713 of the secondary storage apparatus 710 requests a transfer of the journal (user data) in the primary journal volume 616 to the secondary storage apparatus 710 with respect to the primary storage apparatus 610 (S104). The step S104 is executed in an asynchronous manner with other steps.

The control program 613 of the primary storage apparatus 610 transmits the journal from the primary journal volume 616 to the secondary storage apparatus 710 in response to the journal transfer command from the secondary storage apparatus 710. To be more specific, the processor 611 which is allocated to the primary journal volume 616 reads the journal from the primary journal volume 616 to the cache 612 which is allocated to the primary journal volume 616 (S105).

Further, the processor 611 which is allocated to the primary journal volume 616 or another processor 611 transmits the journal from the cache 612 to the secondary storage apparatus 710 via the remote path 805 (S106).

The control program 713 of the secondary storage apparatus 710 writes the journal transferred from the primary storage apparatus 610 to the cache 712 which is allocated to the secondary journal volume 716 (S107). The processor 711 which is allocated to the secondary journal volume 716 or another processor 711 writes the transferred journal to the cache 712.

The processor 711 which is allocated to the secondary journal volume 716 writes the journal stored at the cache 712 to the secondary journal volume 716 (S108).

The processor 711 which is allocated to the secondary journal volume 716 reads the journal stored at the secondary journal volume 716 to the cache 712 allocated to the secondary volume 715 which is where the journal is supposed to be stored (S109). The caches allocated to the secondary journal volume 716 and each secondary volume 715 may be the same or different from one another. The processor 711 (control program 713) is operable to identify, from the address information of the journal, the secondary volume 715 at which the user data of the journal is stored.

The processor 711 which is allocated to the secondary volume 715 at which the journal is supposed to be stored writes the user data in the journal which is stored at the cache 712 to the address in the secondary volume 715 specified by the journal (S110). The secondary storage apparatus 710 deletes the journal in the secondary journal volume 716 upon the completion of the writing of the user data to the secondary volume, and further, requests a deletion of the journal in the primary journal volume 616 and a transfer of a next journal with respect to the primary storage apparatus 610.

Accordingly, the volume replication according to the present embodiment includes the asynchronous remote replication of transferring journals from the primary storage apparatus 610 to the secondary storage apparatus 710. The asynchronous remote replication is carried out between the data volumes configuring a copy pair.

The asynchronous remote replication coincides an order of a replication to the secondary volume with an order (data update order) of writing data to the primary volume. The coincided orders are maintained by the copy groups. The order of writing data to the primary volume of the copy group at the primary storage apparatus 610 coincides with the order (replication order) of writing data to the secondary volume of the copy group at the secondary storage apparatus 710.

For example, the order of writing data to the primary volume 615 coincides with the order of writing data to the secondary volume 715 with respect to all data. The system according to the present embodiment, a sequential number is assigned to the journal. The sequential number is a unique value within a copy group, and indicates the order of writing to the primary volume. The storage apparatuses 610 and 710, and the management servers 200 and 300 are operable, by referring to the sequential number of a journal, to identify the journal within a copy group and learn the order thereof.

As stated above, a program is executed by a processor in order to perform a predetermined process. Accordingly, when the subject of the ongoing description is a program, the description may also include a processor as the subject thereof. Or, a process executed by a program is a process carried out by an apparatus (for example, the storage apparatuses 610 and 710, the storage management server 200, the load information management server 300, or the client server 100) or the system, which are operated by the program.

The processor operates as a functioning unit (means) arranged to realize a predetermined function by operating in accordance with a program. Further, the processor also operates as a functioning unit (means) arranged to realize each of a plurality of processes executed by each program. The apparatus or the system, which includes the processor, is an apparatus or a system which includes such functioning units (means).

According to the present embodiment, information used in the system may be expressed in any data structure irrespective of the data structure thereof. For example, a data structure appropriately selected from a table, a list, a database, or a queue is operable to store information. Note that information used in the system is stored at a storage area of a data storage device. Further, note that when describing contents of information, expressions such as identification information, an identifier, a name, an ID, or a number, or the like, are used, and that each of such expression is substitutable for another.

Hereinbelow, information which the storage management server 200 stores at the DB 207 will be described. The DB 207 stores the information used by the delay time analysis program 204 for assisting the administrator with analyzing the asynchronous remote replication. In the description herein the information stored at the DB 207 is the information concerning the storage system which is different from the storage system configuration of FIG. 1A and FIG. 1B.

The information management program 205 of the storage management server 200 collects and manages the information stored at the DB 207. To be more specific, the information management program 205 accesses the storage apparatuses 610 and 710, collects the information which the control programs 613 and 713 of the storage apparatuses 610 and 710 include respectively, and stores the same at the DB 207. The collected information is stored at a journal volume information table 160, a volume information table 170, a network information table 180, a port information table 190, a processor information table 250, and a cache information table 260. Details concerning these will be described below.

The information management program 205 acquires copy pair configuration information and the information concerning delay time related to a remote replication from the copy pair management program 206 of the storage management server 200, and stores the same at the DB 207. The information is stored at a copy pair information table 150 and a delay time history information table 370. Details concerning these will be described below.

The load information management program 303 of the load information management server 300 accesses the storage apparatuses 610 and 710, collects, from the control programs 613 and 713 of the storage apparatuses 610 and 710, the history of various load information of the resources of the storage apparatuses 610 and 710, and stores the same at the load history information DB 304 of the load information management server 300.

The information management program 205 of the storage management server 200 acquires the information necessary for analyzing delay time from the load history information DB 304 via the load information management program 303 of the load information management server 300, and stores the same at the DB 207. The collected information is stored at a journal volume load history information table 270, a volume load history information table 280, a port load history information table 290, a processor load history information table 350, and a cache load history information table 360. Details concerning these will be described below.

The information management program 205 converts a time point concerning the collected load history information into a standard time, and stores the same at the DB 207. By this, even when two remote sites are in different time zones from one another, values are appropriately displayed using a common time axis in all of the graphs that are used to analyze the asynchronous remote replication. Note that the delay time analysis program 204 may convert the time point based on the information which is collected from the DB 207 into a standard time. Note that the standard time is an arbitrary base period, which is preset.

Hereinbelow, an example of a configuration for each of the above stated table will be described. Note that at each table an identifier represents a unique value in the current system. FIG. 3 illustrates an example of a configuration of the copy pair information table 150 which stores copy pair information. The copy pair information table 150 includes a copy pair column 151, a copy group column 152, a primary storage apparatus column 153, a secondary storage apparatus column 154, a primary journal volume column 155, a secondary journal volume column 156, a primary volume column 157, and a secondary volume column 158.

The copy pair column 151 stores an identifier of a copy pair. The copy group column 152 stores an identifier of a copy group where the copy pair is included. The primary storage apparatus column 153 stores an identifier of the primary storage apparatus including the primary volume of the copy pair. The secondary storage apparatus column 154 stores an identifier of the secondary storage apparatus including the secondary volume of the copy pair.

The primary journal volume column 155 stores an identifier of the primary journal volume which is used for data replication of the copy pair. The primary journal volume column 155 stores an identifier of the secondary journal volume which is used for data replication of the copy pair. The primary volume column 157 stores an identifier of the primary volume of the copy pair. The secondary volume column 158 stores an identifier of the secondary volume of the copy pair.

FIG. 4 illustrates an example of a configuration of the journal volume information table 160 which stores information concerning journal volumes. The journal volume information column 160 includes a journal volume column 161, a storage apparatus column 162, a related processor column 163, and a related cache column 164.

The journal volume column 161 stores an identifier of a journal. The storage apparatus column 162 stores an identifier of the storage apparatus including the journal volume. The related processor column 163 stores an identifier of a processor which is allocated to the journal volume and which carries out writing data to and reading data from the journal volume. The related cache column 164 stores an identifier of a cache which is allocated to the journal volume and which temporarily stores data of the journal volume.

FIG. 5 illustrates an example of a configuration of the volume information table 170 which stores information concerning data volume (primary and secondary volumes). The volume information table 170 includes a volume column 171, a storage apparatus column 172, a related processor column 173, and a related cache column 174. The volume column 171 stores an identifier of the primary volume and an identifier of the secondary volume.

The storage apparatus column 172 stores an identifier of the storage apparatus including the volume. The related processor column 173 stores an identifier of the processor which is allocated to the volume and which carries out writing data to and reading data from the volume. The related cache column 174 stores an identifier of a cache which is allocated to the volume and which temporarily stores data of the volume.

FIG. 6 illustrates an example of a configuration of the network information table 180 which stores information concerning an inter storage network. The network information table 180 includes a remote path column 181, a primary storage apparatus column 182, and a copy group column 183.

The remote path column 181 stores an identifier of a remote path. The primary storage apparatus column includes an identifier of the primary storage apparatus connected to the remote path. The copy group column 183 stores an identifier of the copy group which uses the remote path. In the present example, one or a plurality of copy groups use one remote path, while one copy group uses only one remote path.

FIG. 7 illustrates an example of a configuration of the port information table 190. The port information table 190 includes a port column 191, a storage apparatus column 192, and a related remote path column 193. The port column 191 stores an identifier of a port. The storage apparatus column 192 stores an identifier of the storage apparatus at which the port is mounted. The related remote path column 193 stores an identifier of the remote path to which the port is allocated.

FIG. 8 illustrates an example of a configuration of the processor information table 250. The processor information table 250 includes a processor column 251 and a storage apparatus column 252. The processor column 251 stores an identifier of a processor, while the storage apparatus column 252 stores an identifier of the storage apparatus at which the processor is mounted.

FIG. 9 illustrates an example of a configuration of the cache information table 260. The cache information table 260 includes a cache column 261 and a storage apparatus column 262. The cache column 261 stores an identifier of a cache, while the storage apparatus column 262 stores an identifier of the storage apparatus at which the cache is mounted.

FIG. 10 illustrates an example of a configuration of the journal volume load history information table 270. The journal volume load history information table 270 stores load history of a journal volume. The journal volume load history information table 270 includes a time point column 271, a journal volume column 272, and a utilization rate column 273. The time point column 271 stores a value of a time point. The journal volume column 272 stores an identifier of the primary journal volume and an identifier of the secondary journal volume.

The utilization rate column 273 stores a value indicating a utilization rate of the journal volume at the time point. The utilization rate is expressed by a ratio (d/c) of the amount of data (d) stored at the journal volume with respect to a capacity (c) of the journal volume. The utilization rate column 273 may store, for example, an average value of the utilization rate at the time point or the utilization rate at a specified time prior to the time point.

FIG. 11 illustrates an example of a configuration of the volume load history information table 280. The volume load history information table 280 stores a load history of the primary volume. The volume load history information table 280 includes a time point column 281, a volume column 282, and a write transfer rate column 283.

The time point column 281 and the volume column 282 respectively store a time point and an identifier of the primary volume. The write transfer rate column 283 stores a write transfer rate to the primary volume at the time point. A value (data transfer rate) for the stored write transfer rate is, for example, a value obtained by dividing a write data amount at a specified time prior to the time point by the specified time.

FIG. 12 illustrates an example of a configuration of the port load history information table 290. The port load history information table 290 includes a time point column 291, a port column 292, and a port transfer rate column 293. The time point column 291 stores a value of a time point. The port column 292 stores an identifier of a port which is at one end of each remote path. In the present example, the port column 292 stores an identifier of the port of the primary storage apparatus.

The port column 292 stores an identifier of a port of the primary storage apparatus or the secondary storage apparatus. The port transfer rate column 293 stores a value indicating a data transfer rate at the port at the time point. The value in the port transfer rate column 293 is, for example, a value obtained by dividing a transfer amount at a specified time prior to the time point by the specified time.

FIG. 13 illustrates an example of a configuration of the processor load history information table 350. The processor load history information table 350 includes a time point column 351, a processor column 352, and an operating rate column 353. The point column 351 and the processor column 352 respectively store a time point and an identifier of a processor. The operating rate column 353 stores a value of an operating rate of the processor at the time point. A value for the stored operating rate may also be, for example, an average value of an operating rate at the time point or an operating rate at a specified time prior to the time point.

FIG. 14 illustrates an example of a configuration of the cache load history information table 360. The cache load history information table 360 includes a time point column 361, a cache column 362, and a write time delay probability column 363. The time pint column 361 and the cache column 362 respectively store a time point and an identifier of a cache. The write time delay probability column 363 stores a value of a write time delay probability of the cache at the time point. The value of the stored write time delay probability may also be, for example, an average value of the write time delay probability at the time point or the write time delay probability at a specified time prior to the time point.

The write time delay probability indicates a rate of data amount to be written to a volume (RAID group) at a cache with respect to a cache capacity. The volume to which the data is written includes the primary volume, secondary volume (data volume) or the journal volume. When the data amount to be written to the volume is d, and the cache capacity is c, the data write time delay probability is expressed as d/c. When one cache is allocated to a plurality of volumes, c indicates the amount of data which is to be written to all the volumes to which c is allocated.

FIG. 15 illustrates an example of a configuration of the delay time history information table 370. The delay time history information table 370 includes a time point column 371, a copy group column 372, and delay time column 373. The time point column 371 and the copy group column 372 respectively store a time point and an identifier of a copy group. The delay time column 373 stores a value of a write delay time of the copy group at the time point.

The delay time expresses a difference between a time point of a write to the primary storage apparatus 610 and a time point of a write to the secondary storage apparatus 710. A calculation method for the values concerning delay time which are stored at the delay time history information 370 may be selected from multiple calculation methods.

For example, a time point of a write to the primary storage apparatus may be expressed by a time point at which a write command is issued by the host, a time point at which a write command (including write data) is received from the host, a time point at which a write to the primary volume, or a time point at which a write to the primary journal volume, or the like. The time point of a write to the secondary storage apparatus may be expressed by a time point of a read from the primary journal volume, a time point of a write to the secondary journal volume, or a time point of a write to the secondary volume, or the like.

The administrator is operable to select a value indicating a time point of a write appropriate for analyzing the system or the asynchronous remote replication. According to the above stated example, the time point of a write command issuance is determined by the host and the write command includes the information to indicate such correlation. As for other time points, the primary storage apparatus and the secondary storage apparatus are operable to measure for themselves. The primary storage apparatus and the secondary storage apparatus determine a time point of a write to the journal, which is managed by respective management tables. The journal is operable to identify by using the identifier of the copy group and the sequential numbers.

As stated above, the copy pair management program 206 calculates a delay time. The copy pair management program 206 acquires information concerning a time point of a write to the primary storage apparatus and a time point of a write to the secondary storage apparatus for each journal from the control program of the primary storage apparatus and the secondary storage apparatus. The copy pair management program 206 manages the collected information along with calculated write delay time for each journal. When two sites are in two different time zones, the copy pair management program 206 calculates, for example, a delay time after converting time points into standard time.

A delay time at one of the entries of the delay time history information 370 indicates, for example, a delay time of a journal which indicates a time point of a write to the secondary storage apparatus or the primary storage apparatus in a copy group at the time point or immediately therebefore. An entry at the delay time history information table 370 may indicate an average value of the delay time for a plurality of journals.

The storage management server 200 provides the administrator (user) with information to assist the delay time analysis of the asynchronous remote replication. To be more specific, the storage management server 200 is operable to display at the client server 10 a graph for four steps for the asynchronous remote replication.

The graph for four steps displays, along with a line which indicates the time change of delay time, a line of the time change for one or a plurality of metrics (load on a physical resource) which are preset with respect to each step.

FIG. 16 illustrates the above stated four steps and the metrics (load on physical resource) which are displayable at the graph for each step. The steps for which the graphs are shown include a step of writing to the secondary volume (S110 in FIG. 2), a step of writing to the secondary journal volume (S108), a step of reading from the primary journal volume (S105), and a step of transferring by the remote path (S106).

The metric, which is displayable for each step, includes a value for a physical resource related to the volume or the remote path for each step. For example, the metrics which are displayable in the graph for the step of writing to the secondary volume include the write time delay probability and the operating rate of both the cache and the processor allocated to the secondary volume.

The metrics which are displayable in the graph for the step of writing to the secondary journal volume include the write time delay probability and the operating rate of both the cache and the processor allocated to the secondary journal volume, and the utilization rate of the secondary journal volume.

The metrics which are displayable in the graph for the step of reading from the primary journal volume include the operating rate of the processor allocated to the primary journal volume and the utilization rate of the primary journal volume.

The metrics which are displayable in the graph for the step of transferring by the remote path include the transfer rate at the remote path and the write transfer rate from the host to all primary volumes which use the remote path.

The metrics which are displayable in the graph for each step may include only a portion of the above stated metrics. For example, the graph for the step of writing to the secondary journal volume may be unable to display the utilization rate of the secondary journal volume, while the graph for the step of reading from the primary journal volume may be unable to display the utilization rate of the primary journal volume, and the step of transferring by the remote path may be unable to display the write transfer rate.

The delay time analysis program 204 of the storage management server 200 collects, in accordance with the instruction from the administrator, information necessary for generating the graph image from the DB 207. For example, the administrator is operable to specify a copy group to analyze, a period of a delay time history for which to carry out the analysis, and a step for which to display the graph.

The delay time analysis program 204 generates a graph image data by using the collected information, and transmits the same to the client server 100. The client server 100 generates the graph image from the received data, and displays the same via the management purpose display device 103.

Here, an example of an analysis method (usage of graph) for each step as carried out by the administrator will be described. When the processor operating rate and the write time delay probability of the cache exceed their respective thresholds in the step of writing to the secondary volume, there is a possibility that a data write to the secondary volume from the cache may be delayed due to the high load on the processor. When such phenomenon occurs before an increase of delay time, the administrator is operable to estimate that such phenomenon is the cause of the increase in delay time.

When the write time delay probability of the cache exceeds the threshold, in the step of writing to the secondary volume, even when the processor operating rate is small, there is a possibility that a data write to the secondary volume from the cache may be delayed due to a high load on the secondary volume (i.e., RAID group). When this phenomenon occurs immediately before the increase of delay time, the administrator is operable to estimate that such phenomenon is the cause of the increase in delay time. Otherwise, the administrator is operable to estimate that the insufficiency of cache capacity is the cause of the same.

In the step of writing to the secondary journal volume, a method similar to the method applied to the analysis for the step of writing to the secondary volume may be applied. Further, the information concerning the utilization rate of the secondary journal volume indicates the correlation between the data transfer amount from the primary storage apparatus and the amount of writing to the secondary volume at the secondary storage apparatus. The administrator is operable to learn from such values whether or not there is a delay in data write to the secondary volume at the secondary storage apparatus.

In the step of reading form the primary journal volume, when the processor operating rate exceeds the threshold, there is a possibility that there is a delay in data write to the secondary volume from the cache due to the high load on the processor.

In the step of transferring by the remote path, when the write transfer rate and the remote path transfer rate exceed their respective threshold, there is a possibility that the amount of data to be transferred by the remote path exceeds the threshold due to an increase in the host I/O. When the write transfer rate is small and the remote path transfer rate is greater than the threshold, there is a possibility that some kind of issue is occurring at the remote path. The administrator is operable to estimate, without referring to the write transfer rate, the cause of the issue solely from the remote path transfer rate by using the same method.

Accordingly, since the analysis graph for each step is operable to display each of the above stated metric, it is possible to provide the administrator with information appropriate for assisting the administrator with the delay time analysis.

Figure 17A:
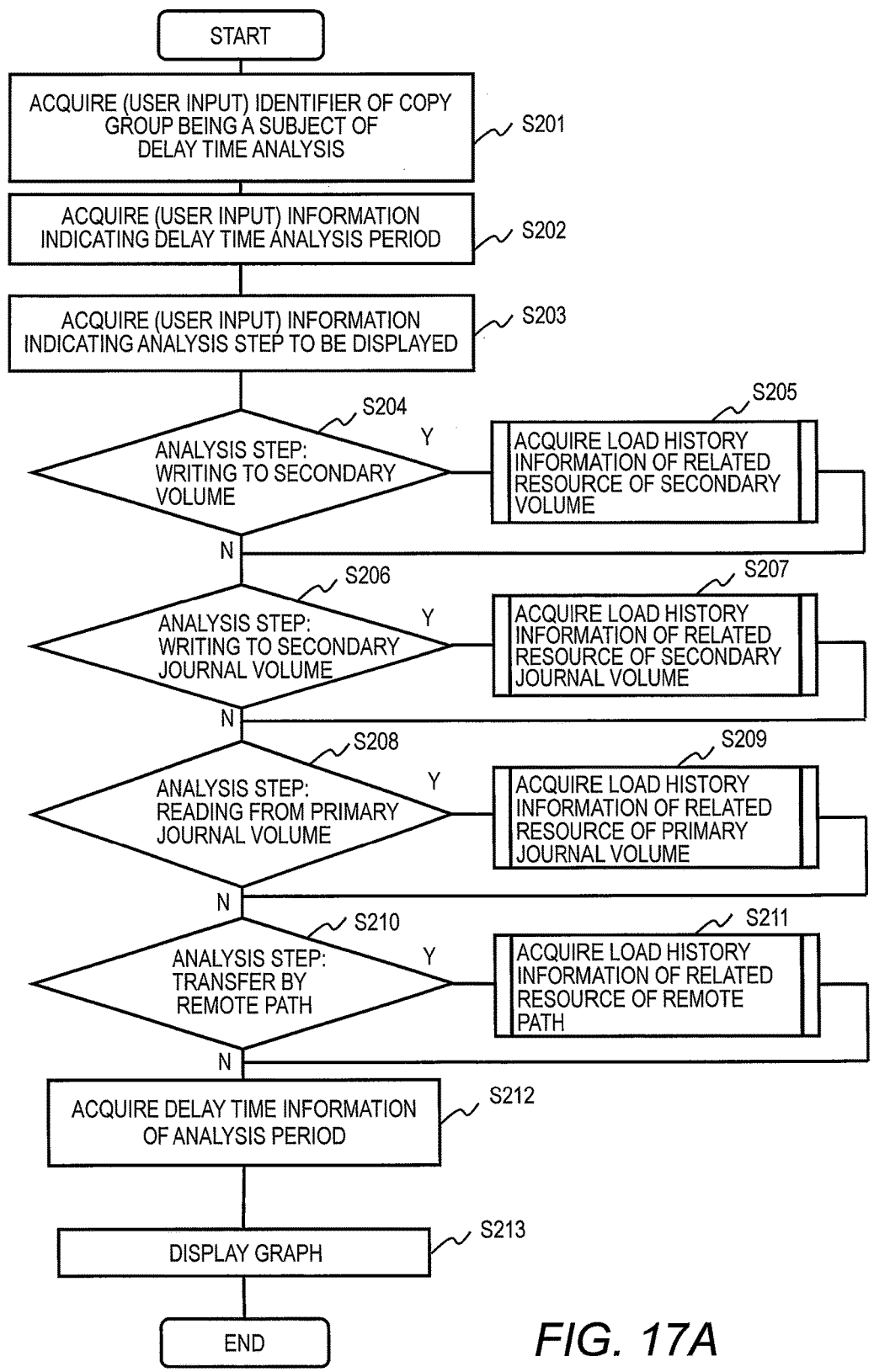
FIG. 17A illustrates a flowchart of an example of a process of a delay time analysis program.

With reference to FIG. 17A to FIG. 17E an example of a process carried out by the delay time analysis program 204 will be described. FIG. 17A illustrates a flowchart of an example of a process of the delay time analysis program 204, while FIG. 17B to FIG. 17E each illustrate the details of the steps from the flowchart in FIG. 17A.

In FIG. 17A, the delay time analysis program 204 acquires an identifier of a copy group which is a subject of a delay time analysis in the asynchronous remote replication (S201). The delay time analysis program 204 further acquires information indicating a period (analysis period) which is a subject of the delay time analysis (S202). The analysis period is, for example, specified in standard time, while the delay time analysis program 204 converts the specified analysis period into an analysis period in standard time.

The delay time analysis program 204 further acquires information indicating a step (a portion of or all of the steps of the above stated four steps in the asynchronous remote replication) which is specified to be displayed by the graph (S205).

The administrator inputs the above stated information, at the above stated steps S201 to S203, via the client server 100. To be more specific, the administrator inputs via a user IF of the client server 100 the information specifying a copy group to be analyzed, a period for the analysis, and a step of the asynchronous remote replication to be displayed by the graph. The client server 100 transmits the inputted information to the storage management server 200.

The administrator specifies the analysis period by, for example, a start date and time of the period and an end data and time of the period from the history of delay time. The administrator is operable to select any number of steps from the above stated four steps of the asynchronous remote replication. Note that the default setting selects, for example, all of the steps.

As a step to display the graph, when the step of writing to the secondary volume is specified (S204: Y), the delay time analysis program 204 acquires the load history information of a resource related to the secondary volume of the specified copy group for the specified analysis period (S205).

As a step to display the graph, when the step of writing to the secondary journal volume is specified (S206: Y), the delay time analysis program 204 acquires the load history information of a resource related to the secondary journal volume of the specified copy group for the specified analysis period (S207).

As a step to display the graph, when the step of reading from the primary journal volume is specified (S208: Y), the delay time analysis program 204 acquires the load history information of a resource related to the primary journal volume of the specified copy group for the specified analysis period (S209).

As a step to display the graph, when the step of transferring by the remote path is specified (S210: Y), the delay time analysis program 204 acquires the load history information of a resource related to the remote path of the specified copy group for the specified analysis period (S211).

Details concerning the steps S205, 207, 209 and 210 will be described below. The delay time analysis program 204 further acquires delay time information of the analysis period (S212). To be more specific, the delay time analysis program 204 refers to the delay time history information table 370 to acquire the delay time information of the specified copy group for the specified analysis period.

The delay time analysis program 204 generates a graph image for each specified step by utilizing the load history information and the delay time information which are collected in the steps stated above, and displays the images via the management purpose display device 103 of the client server 100 (S213).

Figure 17B:
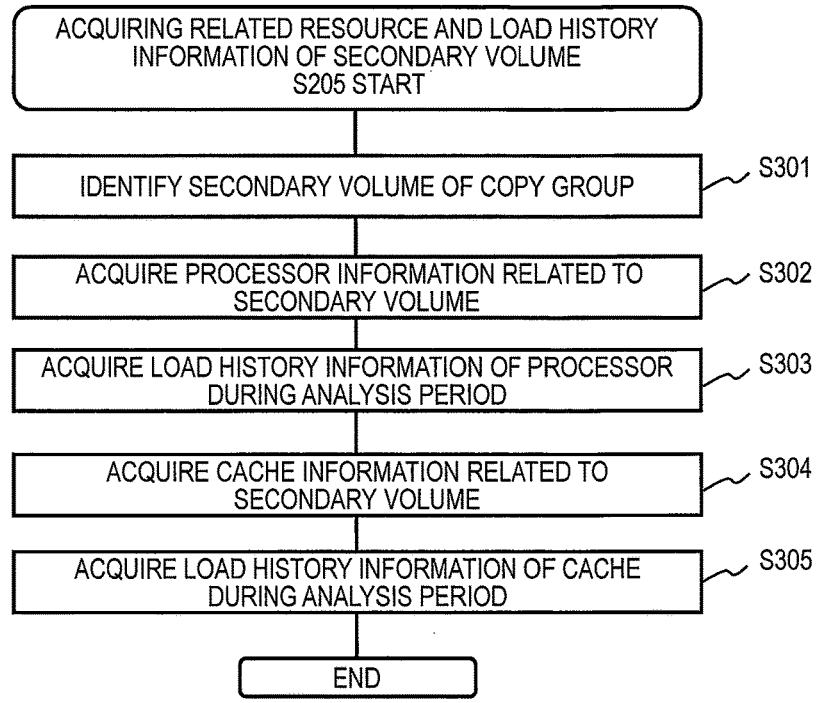
FIG. 17B illustrates a flowchart of a step S205 from the flowchart in FIG. 17A.

Details of the step S205 will be described with reference to the flowchart of FIG. 17B. The delay time analysis program 204 refers to the copy pair information table 150 to identify the secondary volume of the copy pair included in the specified copy group (S301).

The delay time analysis program 204 refers to the volume information table 170 to identify the processor which is allocated to the identified secondary volume (S302). The delay time analysis program 204 refers to the processor load history information table 350 to acquire the history information of the processor operating rate based on the information of the specified analysis period and the identified processor (S303).

The delay time analysis program 204 refers to the volume information table 170 to identify the cache which is allocated to the identified secondary volume (S304). The delay time analysis program 204 refers to the cache load history information table 360 to acquire the history information of the write time delay probability based on the information of the specified analysis period and the identified cache (S305).

Figure 17C:
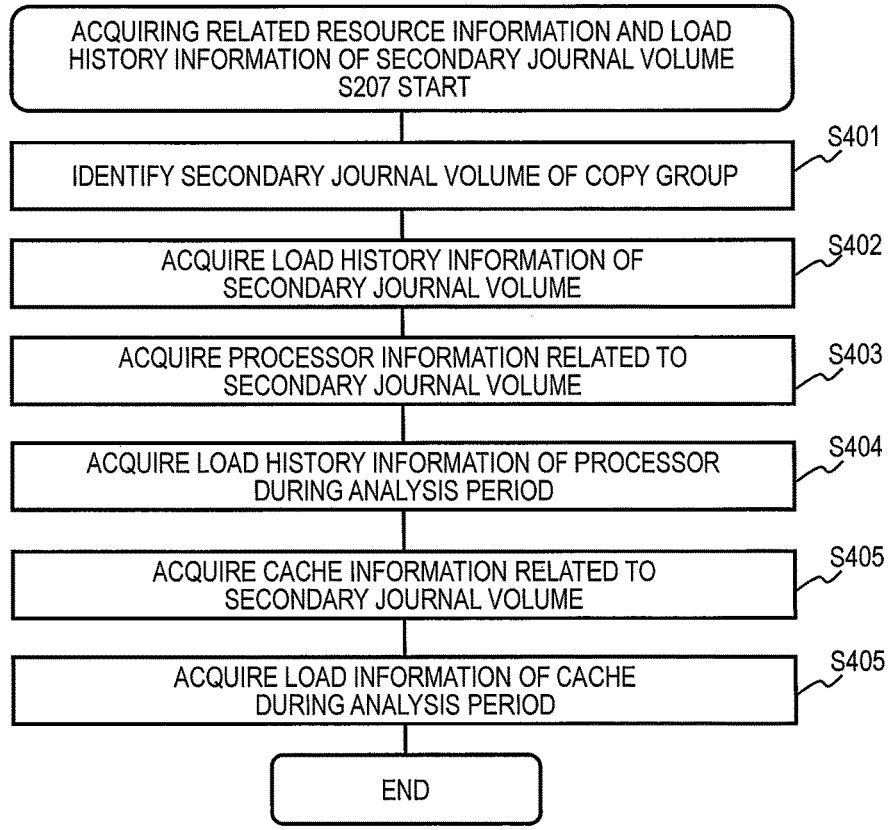
FIG. 17C illustrates a flowchart of a step S207 from the flowchart in FIG. 17A.

Details of the step S207 will be described with reference to the flowchart of FIG. 17C. The delay time analysis program 204 refers to the copy pair information table 150 to identify the secondary journal volume included in the specified copy group (S401).

The delay time analysis program 204 refers to the journal volume load history information table 270 to acquire the history information of the utilization rate based on the information of the specified analysis period and the identified secondary journal volume (S402).

The delay time analysis program 204 refers to the journal volume information table 160 to identify the processor which is allocated to the identified secondary journal volume (S403). The delay time analysis program 204 refers to the processor load history information table 350 to acquire the history information of the processor operating rate based on the information of the specified analysis period and the identified processor (S404).

The delay time analysis program 204 refers to the journal volume information table 160 to identify the cache which is allocated to the identified secondary volume (S405). The delay time analysis program 204 refers to the cache load history information table 360 to acquire the history information of the write time delay probability based on the information of the specified analysis period and the identified cache (S406).

Figure 17D:
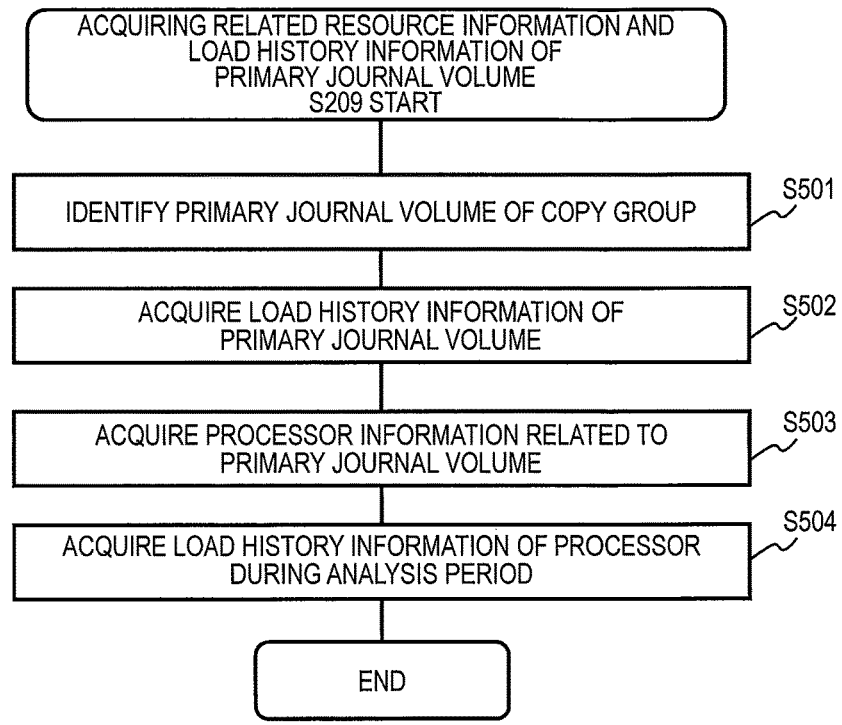
FIG. 17D illustrates a flowchart of a step S209 from the flowchart in FIG. 17A.

Details of the step S209 will be described with reference to the flowchart of FIG. 17D. The delay time analysis program 204 refers to the copy pair information table 150 to identify the primary journal volume which is included in the specified copy group (S501).

The delay time analysis program 204 refers to the journal volume load history information table 270 to acquire the history information of the utilization rate based on the information of the specified analysis period and the identified primary journal volume (S502).

The delay time analysis program 204 refers to the journal volume information table 160 to identify the processor which is allocated to the identified primary journal volume (S503). The delay time analysis program 204 refers to the processor load history information table 350 to acquire the history information of the processor operating rate based on the information of the specified analysis period and the identified processor (S504).

Figure 17E:
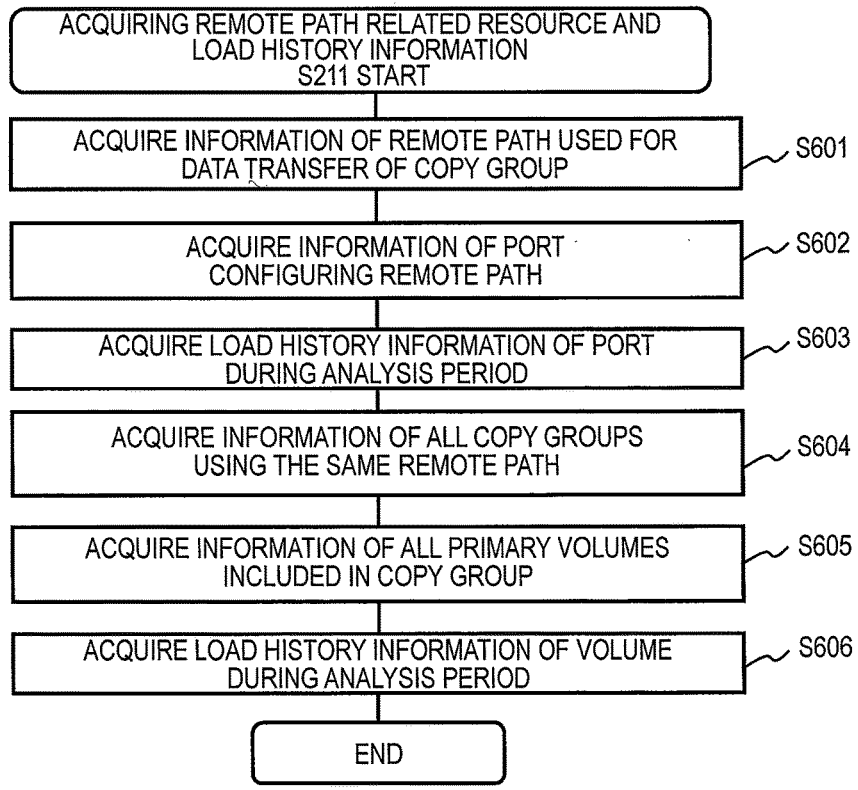
FIG. 17E illustrates a flowchart of a step S211 from the flowchart in FIG. 17A.

Details of the step S211 will be described with reference to the flowchart of FIG. 17E. The delay time analysis program 204 refers to the network information table 180 to identify the remote path which the specified copy group uses (S601).

The delay time analysis program 204 refers to the port information table 190 to identify the port included in the identified remote path (S602). The delay time analysis program 204 refers to the port load history information table 290 to acquire the history information of the port transfer rate based on the information of the specified analysis period and the identified port (S603).

The delay time analysis program 204 refers to the network information table 180 to identify all copy groups that use the identified remote path (S604). The delay time analysis program 204 refers to the copy pair information table 150 to identify the primary volumes of all of the identified copy pairs (S605). The delay time analysis program 204 refers to the volume load history information table 280 to acquire the history information of the write transfer rate based on the information of all of the identified primary volumes (S606).

Hereinafter, the display image (graph) for the delay time analysis in the asynchronous remote replication will be described. The delay time analysis program 204 displays the graph which indicates the time changes of delay time and physical resource load. The administrator is operable to appropriately identify in a short time the resource which is the cause for the increase in delay time by referring to the graph.

Figure 18A:
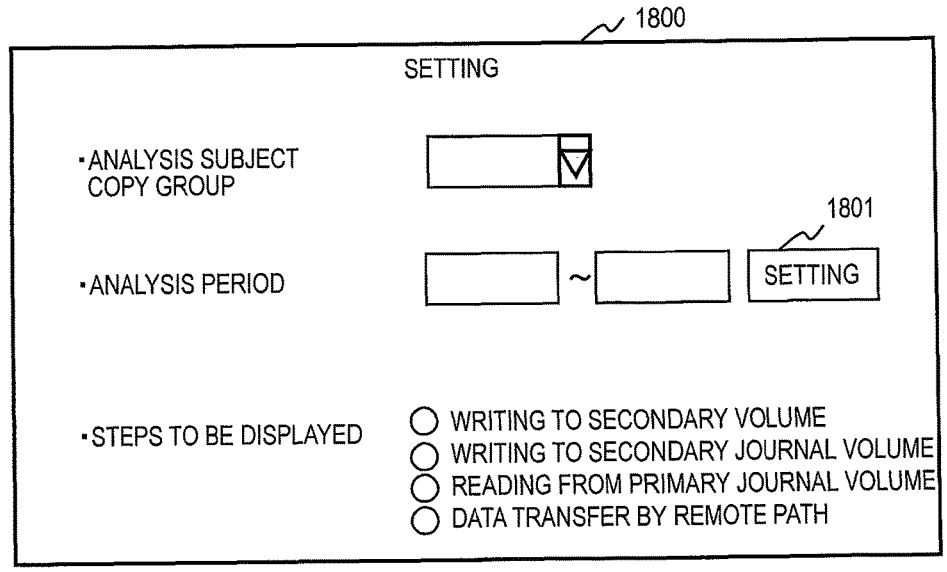
FIG. 18A illustrates an example of an image arranged for an administrator to perform a setting with respect to an image display for an analysis of the asynchronous remote replication.

FIG. 18A illustrates an example of a setting image 1800 for the administrator regarding an image display for the asynchronous remote replication analysis. As stated above, the administrator is operable to specify, via the setting image 1800 at the management purpose display device 103, a copy group for which to display a graph in order to perform a delay time analysis, a period of the delay time history for which to perform the analysis, and a step in the asynchronous remote replication for which to display the graph. The delay time analysis program 204 transmits the data of the setting image 1800 to the client server 100.

Figure 18B:
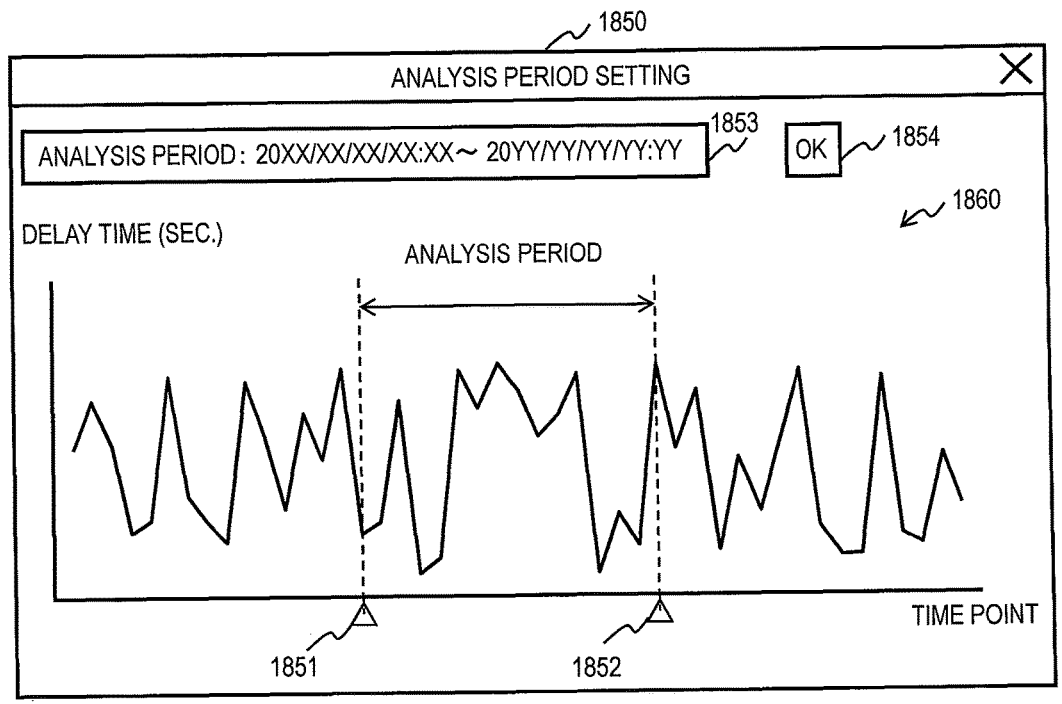
FIG. 18B illustrates an example of an image for setting an analysis period.

At the setting image 1800, an analysis subject copy group is selected from a pull down menu, while an analysis step is selected via a radio button. The client server 100 notifies, when the administrator makes a selection at a setting button 1801 via the input device 106, the delay time analysis program 204 of the copy group, which is selected or already specified, and receives data for an analysis period setting image 1850, which is illustrated in FIG. 18B.

The analysis period setting image 1850 includes a graph 1860 which illustrates a time change in the delay time of the specified copy group. A horizontal axis of the graph indicates time points (date and time) while the vertical axis of the graph indicates delay time. The delay time analysis program 204 is operable to generate the graph image 1860 by acquiring the delay time history information of the specified copy group from the delay time history information table 370.

The administrator is operable to specify the analysis period (start date and time, and end date and time) by indicating a date and time on the graph using pointers 1851 and 1852. The administrator is operable to specify the analysis period by entering numerical values at a section 1853. When a button 1854 is selected, the specified analysis period is confirmed. The specified analysis period is applied to the graphs of all the steps to be displayed. By this, it is possible to appropriately display the information necessary for the administrator to perform a delay time analysis.

The client server 100 (GUI program) transmits the identifier of the copy group, the analysis period and the analysis step to be graphically displayed as specified by the administrator to the storage management server 200 (correspond to the steps S201 to S203 in FIG. 17A).

Figure 19:
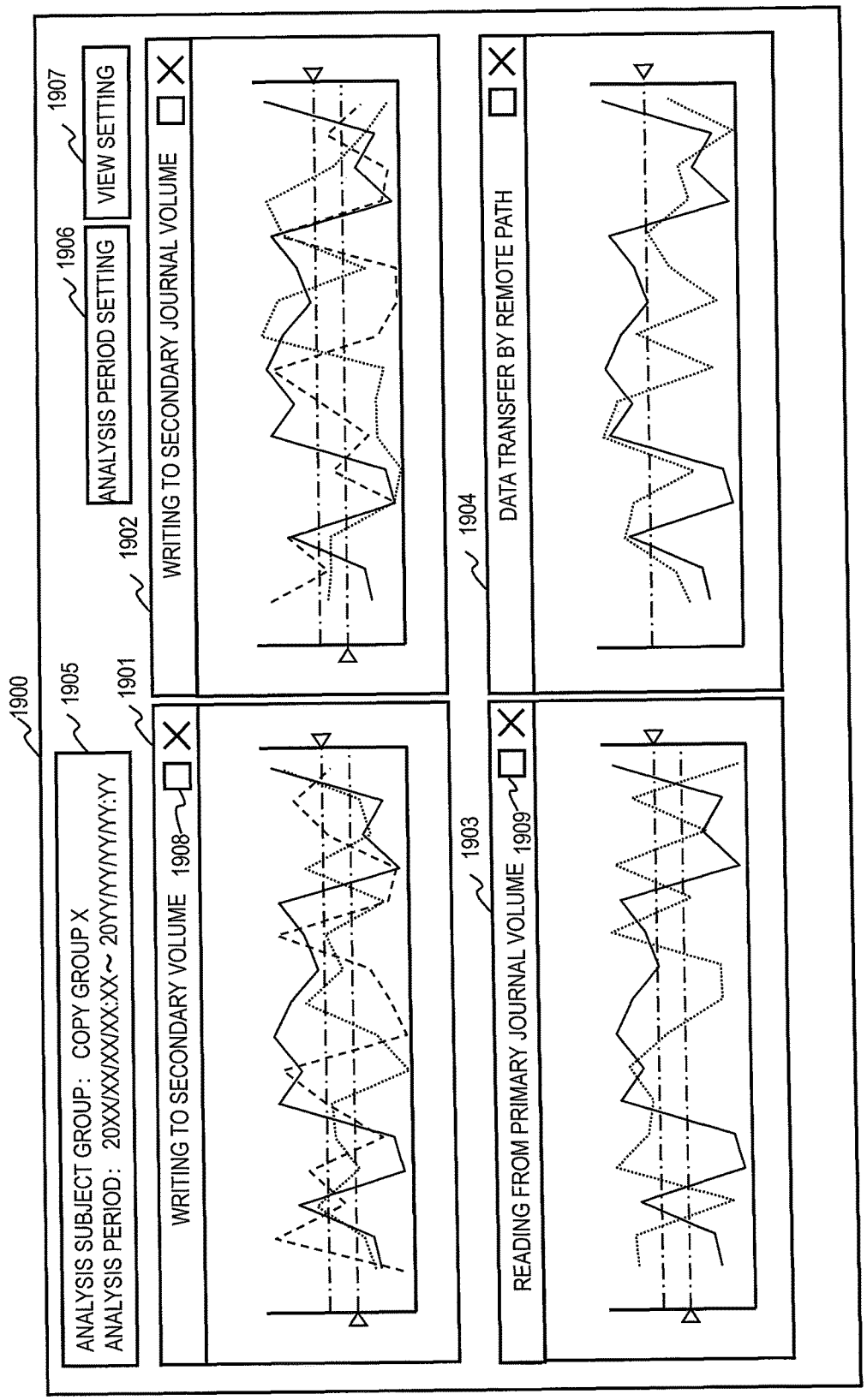
FIG. 19 illustrates an example of an image for a delay time analysis.

FIG. 19 illustrates an example of an image 1900 for a delay time analysis. The image 1900 shows all graphs for the above stated four steps in an asynchronous remote replication. For example, the image 1900 is displayed in accordance with the selection of four steps by the administrator or a default setting.

The image 1900 includes a graph 1901 for the step of writing to the secondary volume, a graph 1902 for the step of writing to the secondary journal volume, a graph 1903 for the step of reading from the primary journal volume, and a graph 1904 for the step of data transfer by the remote path.

In FIG. 19, a section 1905 indicates the specified copy group and the analysis period which are the subject of the analysis. The analysis period is constant to all graphs which are displayed. In the graphs 1901 to 1904, the horizontal axis indicates time points while the vertical axis on the left indicates the value for the metric and the vertical axis on the right indicates the value for delay time. The analysis period shown in each of graphs 1901 to 1904 is in agreement with one another.

When a period setting button 1906 is selected, the client server 100 displays the analysis period setting image 1850 illustrated in FIG. 18B. The administrator is operable to re-specify the analysis period at the analysis period setting image 1850. The client server 100 transmits the information of the re-specified analysis period to the storage management server 200, and the delay time analysis program 204 executes the steps S204 to S213 of FIG. 17A.

When a view setting button 1907 is selected, the client server 100 receives a view setting image (not illustrated) from the delay time analysis program 204, and displays the same. The administrator is operable to specify an arrangement (numbers of rows and lines) of the graphs in the image 1900. The client server 100 transmits view setting information to the storage management server 200, while the delay time analysis program 204 transmits the graph image data which is generated in accordance with the view setting information to the client server 100.

Figure 20:
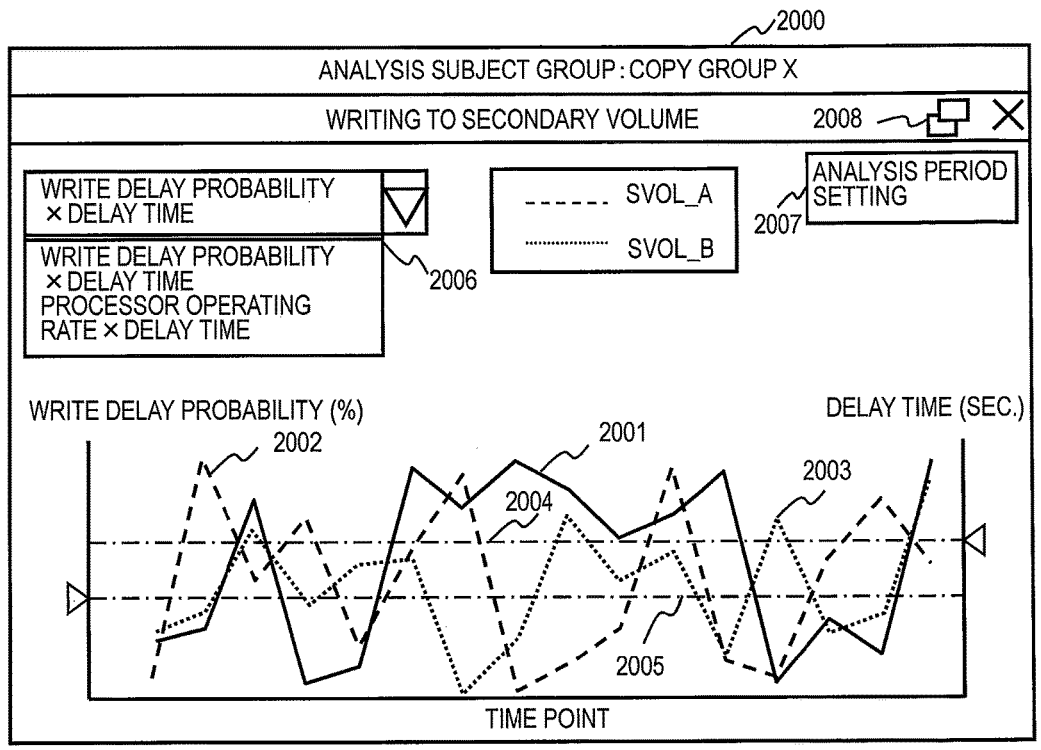
FIG. 20 illustrates an example of a graph image of a step of writing to a secondary volume which is displayed in an enlarged manner.

When a zoom button is selected for any of the graphs on the image 1900, only the selected graph is displayed in an enlarged manner. For example, when a zoom button 1908 on the graph image 1901 for the step of writing to the secondary volume is selected, the client server 100 displays a graph image 2000, which is illustrated in FIG. 20, in the enlarged manner.

The image 2000 illustrates the graph for the step of writing to the secondary volume. The horizontal axis of the graph indicates time points (date and time) while the vertical axis on the left indicates write time delay probability, and the axis on the right indicates delay time. A line 2001 indicates the time change of delay time. Lines 2002 and 2003 respectively indicate the time change in the write time delay probability for secondary volumes SVOL_A and SVOL_B. The secondary volumes SVOL_A and SVOL_B are all of the secondary volumes which are included in an identified copy group X.

A line 2004 indicates a threshold of delay time, while a line 2005 indicates a threshold of write time delay probability. These thresholds are preset by the administrator or a system provider. Each threshold is a standard value for the analysis of delay time and metric. Since the thresholds and measured values are displayed simultaneously, the administrator is operable to compare the measured values with the thresholds, which provide standard therefor, and readily determine a status of deterioration of the measured values.

Further, the administrator is operable to compare the time changes of delay time and metric, and determine, by comparing the time points in which their respective thresholds are exceeded, that the resource indicated by the metric is the cause of the deterioration of delay time.

The administrator is operable to select at a pull down section 2006 a metric, which is displayed on the graph along with the time change of delay time. As illustrated in FIG. 16, the graph for the step of writing to the secondary volume is operable to display, besides the write time delay probability, the time change of processor operating rate. The processor operating rate is the operating rate of the processor which is allocated to each of the secondary volume of the selected copy group.

The client server 100 acquires in advance the data for each graph image for all combinations of measures values which may be selected via the section 2006 from the delay time analysis program 204. A GUI image program (for example, browser program) of the client server 100 displays, when the metric to be displayed is selected via the section 2006, the graph which indicates the selected metric and the time change of delay time simultaneously.

The section 2006 may provide only one option of displaying only one metric along with delay time simultaneously. For example, "write time delay probability X delay time," or "processor operating rate X delay time" may be the only options to be provided in the graph for the step of writing to the secondary volume. Accordingly, it is possible to prevent the graph from becoming visibly unclear with too many overlapping lines.

The GUI images of the graphs may further provide an option where multiple metrics are displayed simultaneously with delay time. For example, the section 2006 may provide an option including "write time delay probability X processor operating rate X delay time." Each graph may display the thresholds of delay time and metric simultaneously. Note that the graphs may also display no thresholds (standard values). The above stated points apply to GUI images of all graphs.

When an analysis period setting button 2007 is selected, the client server 100 displays the analysis period setting image 1850 illustrated in FIG. 18, and accepts a reentry concerning an analysis period setting from the administrator.

The analysis period which is reset is also applied to the graphs for other steps as well. When a reduction button 2008 is selected at the image 2000, the client server 100 displays, as illustrated in FIG. 19, an image diagraming all the selected steps.

Although an example in FIG. 20 illustrates the metric time change of all the secondary volumes in one copy group, the administrator is operable to display the metric time change of the secondary volumes, which are selected by the administrator. The client server 100 may display a line, which is selected via the pointer, in a more prominent manner than other lines.

Although the images 1901 to 1904 of FIG. 19 omit the detailed illustration thereof, the image 1901 includes the same image configuration as the image 2000. The administrator is operable to perform the operation, which is described with reference to the image 2000, on the image 1901 as well. The image 1901 may also include a configuration different from that of the image 2000. These points apply to other images 1902 to 1904 as well.

Figure 21:
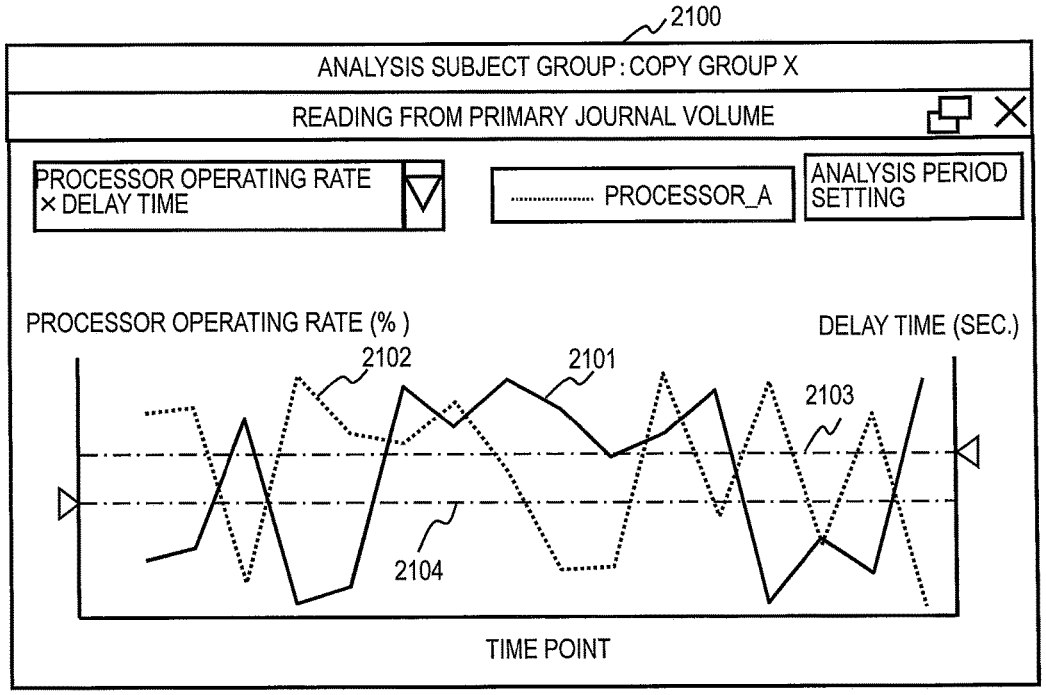
FIG. 21 illustrates an example of a graph image of a step of reading from a primary journal volume which is enlarged.

FIG. 21 illustrates an example of an enlarged image 2100 (selection of a zoom button 1909 in FIG. 19) of the graph for the step of reading from the primary journal volume. Hereinafter, differences between the example in FIG. 21 and the graph image 2000 for the step of writing to the secondary volume in FIG. 20 will be described primarily.

In the graph image 2100, the horizontal axis indicates time points (date and time), while the vertical axis on the left indicates the processor operating rate, and the vertical axis on the right indicates delay time. A line 2101 indicates the time change of delay time. A line 2102 indicates the time change of the operating rate of the processor_A. A line 2103 indicates the threshold of delay time, and a line 2104 indicates the threshold of the processor operating rate.

The processor_A is a processor that is allocated to all the secondary volumes which are included in the specified copy group X. In the present example, the same processor_A is allocated to all of the secondary volumes. When a processor different from the processor_A is allocated, the time change of the operating rate thereof will be displayed. The client server 100 accepts an operation similar the operation, which is described with reference to FIG. 20, at the image 2100.

The client server 100 accepts the operations, which are same as those for the graphs of the above stated steps, for the graph 1902 for the step of writing to the secondary journal volume and the graph 1904 for data transfer by the remote path.

As described with reference to FIG. 16, the metrics, which are displayable in the graph for the step of writing to the secondary journal volume, include the following. One of such metrics is the write time delay probability of the cache allocated to the secondary journal volume of the specified copy group. Another one of such metrics is the operating rate of the processor allocated to the secondary journal volume of the specified copy group. Another one of such metrics is the utilization rate of the secondary journal volume of the specified copy group.

The metrics, which are displayable in the graph for the data transfer by the remote path, include the following. One of such metrics is the data transfer rate of the remote path used by the specified copy group. Another one of such metrics is the total value of the write transfer rate to all of the primary volumes which use the remote path.

Hereinbelow, a GUI for a delay time analysis by a software wizard will be described. The delay time analysis program 204 displays the graphs for the four steps of the asynchronous remote replication stated above in a sequential manner, and accepts an input from the administrator concerning the analysis result for each graph. The delay time analysis program 204 provides the administrator with the analysis result, from the analysis result for each graph as inputted by the administrator, regarding the cause which deteriorates delay time. By this, it is possible to assist the administrator with the delay time analysis more efficiently. In particular, it is advantageous for administrators who are not well experienced with delay time analysis.

Figure 22:
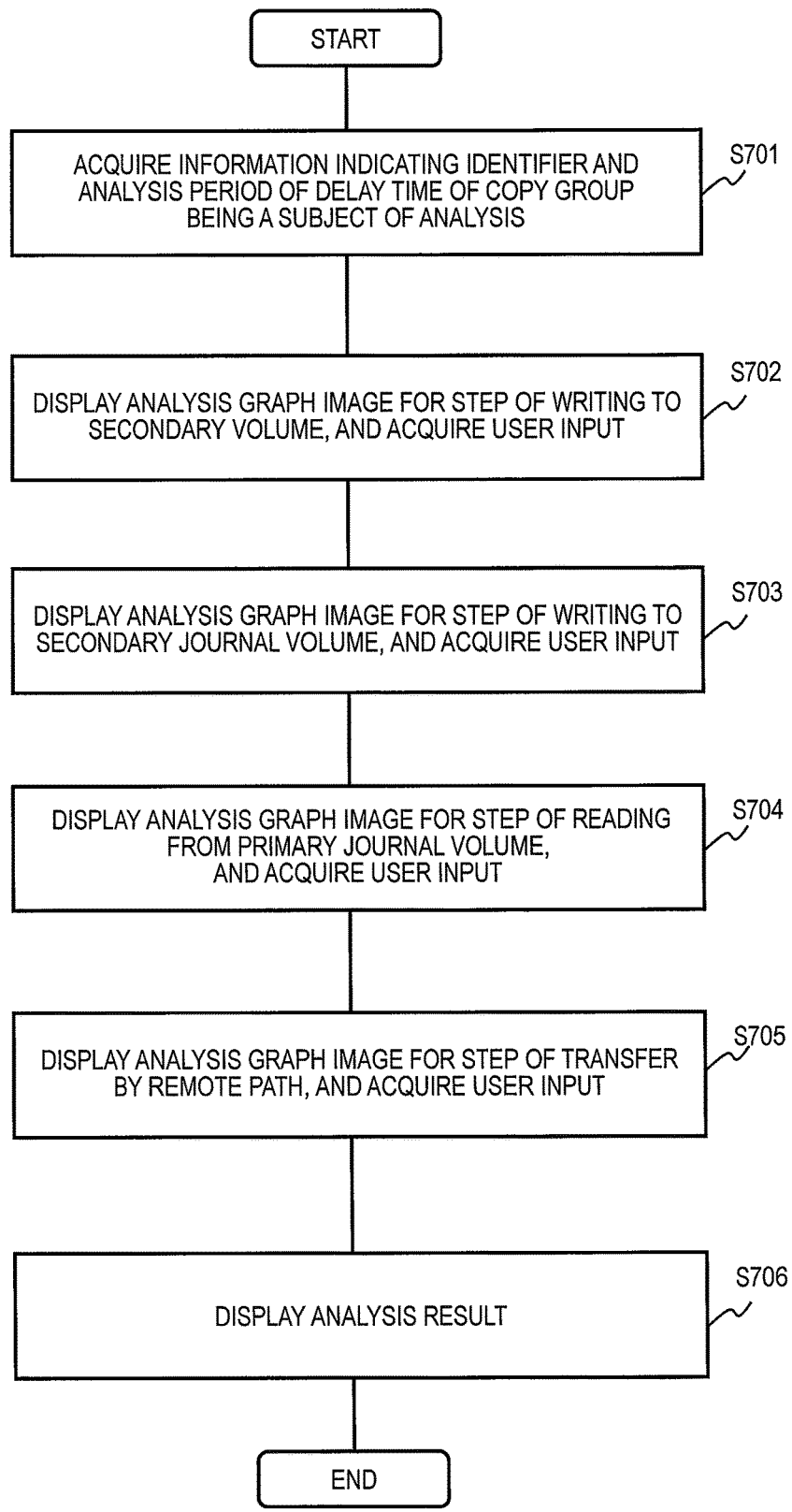
FIG. 22 illustrates a flowchart of a process by a delay time analysis program by a wizard GUI.

Hereinbelow, more specific description will be given. FIG. 22 illustrates a flowchart of a process by the delay time analysis program 204 by the wizard GUI. Firstly, the delay time analysis 204 acquires the information indicating the copy group and the analysis period of the analysis subject (S701). To be more specific, the client server 100 displays a setting image, and transmits a user input with respect to the setting image to the delay time analysis program 204.

Next, the delay time analysis program 204 displays a graph image for analyzing the step of writing to the secondary volume, and further, acquires the user input inputted on the image (S702). Next, the delay time analysis program 204 displays a graph image for analyzing the step of writing to the secondary journal volume, and further, acquires the user input inputted on the image (S703).

Next, the delay time analysis program 204 displays a graph image for analyzing the step of reading from the primary journal volume, and further, acquires the user input inputted on the image (S704). Next, the delay time analysis program 204 displays a graph image for analyzing the data transfer step by the remote path, and further, acquires the user input inputted on the image (S705). Finally, the delay time analysis program 204 displays the result for the analysis of delay time in accordance with the user input for each step (S706).

According to the present flowchart, the delay time analysis program 204 generates image data and the client server 100 displays the image in the same manner as in the flowchart of FIG. 17A. The client server 100 accepts an input inputted with respect to the display image by the administrator, and transmits the same to the delay time analysis program 204. The delay time analysis program 204 generates the graph for each step of the selected copy group for the specified analysis period, and displays the same.

As described above, it is possible for the administrator to easily understand the analysis for the remote replication by displaying the analysis graphs in a sequential manner for the four steps in a retroactive manner starting with the step of writing to the secondary volume. Further, it is possible to conveniently identify whether the deterioration of delay time is originated from a delay in a journal transfer request from the secondary storage apparatus or from a delay of the data transfer since the analysis on the secondary storage apparatus is carried out before the analysis of the primary storage apparatus and the remote path.

Figure 23:
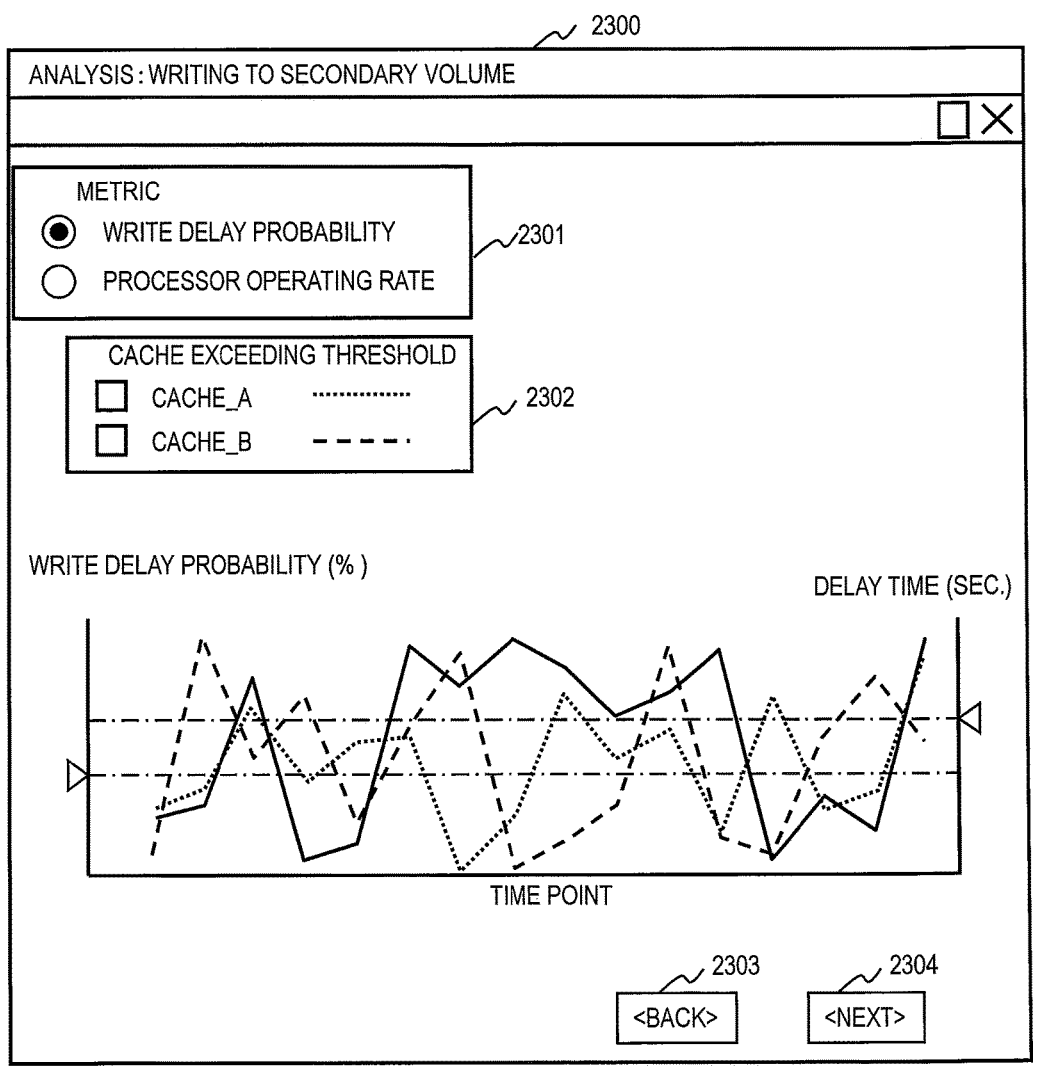
FIG. 23 illustrates an example of a GUI image for analyzing the step of writing to the secondary volume by a wizard.

FIG. 23 illustrates an example of a GUI image 2300 for analyzing a step of writing to the secondary volume by a wizard. In the step S702 of FIG. 22, the client server 100 displays the image 2300 from the data received from the delay time analysis program 204. The graph displayed on the image 2300 is the same as the graph illustrated in FIG. 20.

The administrator selects a metric to be displayed in the graph at a section 2301. The administrator refers to the graph which is on display, and inputs the analysis result at a section 2302.

In the example in FIG. 23, the administrator, upon determining which cache's time change of the write time delay probability is the cause of the deterioration of delay time, selects the cache at the section 2302. The administrator makes a determination, from the correlation among the threshold, the time change of delay time, and the time change of the measured value of the metric displayed in the graph, as to whether any of the measured time changes for one of the metrics is the cause of the deterioration of delay time.

The administrator inputs an analysis result to all metrics displayed at the section 2301, namely the cache write time delay probability, and the processor operating rate. The client server 100 transmits the analysis result for the steps inputted by the administrator to the delay time analysis program 204.

When a "NEXT" button 2304 is selected at the image 2300, the client server 100 displays the GUI image (unillustrated) for analyzing the step of writing to the secondary journal volume from the data received from the delay time analysis program 204 (S703). When a "BACK" button is selected, the client server 100 displays a previous image.

When the analysis at the GUI image (unillustrated) for analyzing the step of writing to the secondary journal volume is finished, and when the "NEXT" button is selected, the client server 100 displays, from the data received from the delay time analysis program 204, the GUI image for analyzing the step of reading from the primary journal volume (S704). The GUI image indicates the correlation between the delay time and the metric at the step of reading from the primary journal volume as shown in FIG. 16 in the same manner as described above with reference to FIG. 23 and in the same manner as will be described below with reference to FIG. 24.

Figure 24:
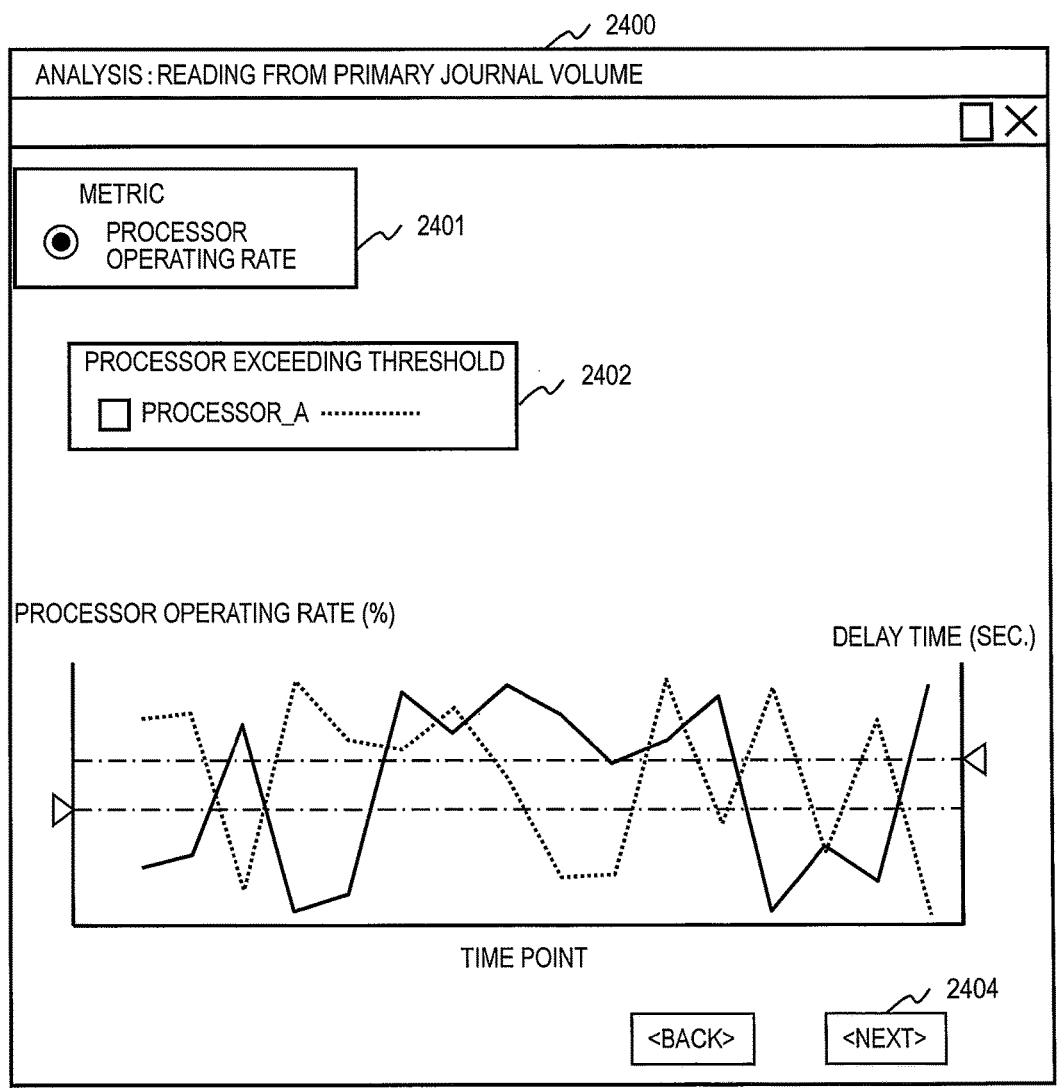
FIG. 24 illustrates an example of a GUI image for analyzing a step of reading from a primary journal volume.

FIG. 24 illustrates an example of a GUI image 2400 for analyzing the step of reading from the primary journal volume. The graph indicated by the image 2400 is the same as the graph illustrated in FIG. 21. The administrator selects a metric to be displayed in the graph at a section 2401. The administrator refers to the graph on display, and inputs the analysis result at the section 2402.

In the example of FIG. 24, upon determining that the time change of the operating rate of a processor is the cause of the deterioration of delay time, the administrator selects the processor at the section 2402. It is estimated that the increase in the operating rate of the processor causes the increase in the delay time when the operating rate of the processor reaches the threshold immediately before the time point in which the delay time reaches the threshold, for example.

When a "NEXT" button 2404 is selected at the image 2400, the client server 100 displays the GUI image (unillustrated) for analyzing the step of data transfer by the remote path from the data received from the delay time analysis program 204 (S705). The GUI image indicates the correlation between the delay time and the metric at the step of data transfer by the remote path as shown in FIG. 16 in the same manner as previously described with reference to FIG. 23 and FIG. 24.

FIG. 25 illustrates an example of an analysis result image 2500 of the delay time analysis program 204. The delay time analysis program 204 acquires the information of an analysis result for each step by the administrator from the client server 100, estimates the cause for the deterioration of delay time for all of four steps, and further, determines a measure to counter the estimated cause.

In the analysis result image 2500, an analysis subject summary section 2501 indicates a copy group and an analysis period which are the subject of the analysis. An analysis result summary section 2502 indicates the number of problems pointed by the administrator for each step. The number of problems for each step includes, for example, the number of resources which the administrator selects as being problematic at the GUI image for the analysis for each step. For example, in FIG. 23, a resource having a problem is selected at the section 2302.

The section 2503 indicates the estimated cause for the deterioration of delay time and a countermeasure therefor as determined by the delay time analysis program 204. The delay time analysis program 204 includes a mapping table, which maps estimated causes and countermeasures therefor, with respect to the analysis results by the administrator for each step.

FIG. 26 illustrates an example of a configuration of a mapping table 390. The delay time analysis program 204 refers to the mapping table with respect to each volume and each remote path, and determines from the analysis result by the administrator the estimated cause for the deterioration of delay time and the countermeasure therefor.

In order to facilitate the understanding of the present embodiment, the mapping table 390 in FIG. 26 indicates the information contents which may be included in an original mapping table. The mapping table 390 includes a step column 391, a marked metric column 392, a cause column 393, and a countermeasure column 394. The marked metric column 392 includes a metric selected by the administrator as problematic.

The cause column 393 and the countermeasure column 394 respectively indicate an estimated cause for the deterioration of delay time and a countermeasure therefor. Note that the cause column 393 and the countermeasure column 394 of the actual mapping table 390 store the texts which will be displayed on the image.

As stated above, according to the present embodiment, in an RPO monitoring business which includes maintaining the SLA for a disaster recovery system, it is possible to provide the information to easily analyze the cause for an increase of delay time, which serves as an index of the deterioration of PRO (Recovery Point Objective), and reduce the workload on the users engaged in PRO monitoring business.

Note that the present invention is not limited to the examples stated above, and includes various modifications. For example, although the system as described in the example above accepts the selection for a copy group to be displayed in the analysis graph, the system may be configured such that the selection of a copy pair is accepted. Note that a selection of a copy group which is made up from one copy pair corresponds to a selection of a copy pair.

Note that the role played by the processes executed by each apparatus in the above described system is merely exemplary, and a portion of one process may be executed by an apparatus different from one described above. For example, a portion of a process for displaying a GUI image for a graph analysis by the storage management server 200 may be executed by the client server 100.

The foregoing embodiment has been described in details for better understanding of the present invention and is not limited to the one including all the configurations described above. A part of the configuration of one example may be replaced with that of another example; the configuration of one example may be incorporated to the configuration of another example. A part of the configuration of each example may be added, deleted, or replaced by that of a different configuration.

The above-described configurations, functions, and processing units, for all or a part of them, may be implemented by hardware: for example, by designing an integrated circuit. The above-described configurations and functions may be implemented by software, which means that a processor interprets and executes programs for implementing the functions. The information of programs, tables, and files to implement the functions may be stored in a storage device such as a memory, a hard disk drive, or an SSD (Solid State Drive), or a storage medium such as an IC card, or an SD card.

What is claimed is:

1. A computer system comprising:
   a management system;
   a primary storage apparatus including a primary volume and a primary journal volume; and
   a secondary storage apparatus, communicating via a network with the primary storage apparatus, and including a secondary volume and a secondary journal volume,
   wherein the primary storage apparatus is configured to write replicated data of data stored at the primary volume to the primary journal volume,
   wherein the primary storage apparatus is configured to read the data from the primary journal volume, and outputs the data to the network,
   wherein the secondary storage apparatus is configured to write the data received from the network to the secondary journal volume via a cache, and
   wherein the secondary storage apparatus is configured to write the data read from the secondary journal volume to the secondary volume via a cache,
   wherein the management system is configured to receive a designation of at least one step selected from a first step of writing data to the secondary volume, a second step of writing data to the secondary journal volume, a third step of reading data from the primary journal volume and a fourth step of transferring data by the network, and a designation of an analysis period,
   wherein the management system is configured to acquire history information of a load on a resource corresponding to the at least one selected step for the analysis period, and history information of a delay time related to a data replication conducted between the primary storage apparatus and the secondary storage apparatus for the analysis period,
   wherein the management system is configured to display a graph of the history information on the load and the history information of the delay time for the analysis period for the at least one selected step,
   wherein the management system is configured to accept, with respect to each of the first step to the fourth step, an input from a user on an analysis result,
   wherein the management system is configured to estimate from the analysis result inputted by the user a cause for an increase of the delay time,
   wherein the management system is configured to determine a measure to counter the estimated cause, and displays the measure with the estimated cause,
   wherein when the first step is designated, the management system is configured to acquire history information of an operating rate of a processor included at the secondary storage apparatus, and history information of a write time delay probability for a cache included at the secondary storage apparatus,
   wherein when the first step is designated, the management system is configured to display in a single graph at least one of the history information of the operating rate and the history information of the write time delay probability, and the history information of the delay time, and wherein when a plurality of steps are designated from the first step to the fourth step, and when the analysis period with respect to one of the plurality of designated steps is changed, the management system is configured to coordinate the analysis period for the plurality of steps to be the same as the changed analysis period for the one of the plurality of designated steps.

2. The computer system according to claim 1,
wherein when the second step is designated, the management system is configured to acquire history information of an operating rate of a processor included at the secondary storage apparatus, history information of a write time delay probability for a cache included at the secondary storage apparatus, and history information of a utilization rate of the secondary journal volume, and
wherein when the second step is designated, the management system is configured to display in a single graph at least one of the history information of the operating rate, the history information of the write time delay probability, and the history information of the utilization rate, and the history information of the delay time.

3. The computer system according to claim 1,
wherein when the third step is designated, the management system is configured to acquire history information of an operating rate of a processor included at the primary storage apparatus, and history information of a utilization rate of the primary journal volume, and
wherein when the third step is designated, the management system is configured to display in a single graph at least one of the history information of the operating rate and the history information of the utilization rate, and the history information of the delay time.

4. The computer system according to claim 1,
wherein when the fourth step is designated, the management system is configured to acquire history information of a transfer rate of data conducted via a remote path between the primary storage apparatus and the secondary storage apparatus, and history information of a data write transfer rate to the primary storage apparatus, and
wherein when the fourth step is designated, the management system is configured to display in a single graph at least one of the history information of the transfer rate by the remote path and the history information of the write transfer rate, and the history information of the delay time.

5. The computer system according to claim 1,
wherein the management system is configured to display, with respect to each of the first step to the fourth step, a graph indicating history information of a load on a resource and history information of a delay time.

6. A method of a management system for assisting a user in analyzing an asynchronous remote replication in a storage system including a primary storage apparatus and a secondary storage apparatus communicating via a network with the primary storage apparatus,
wherein the primary storage apparatus writes replicated data of data stored at the primary volume to the primary journal volume, and
wherein the primary storage apparatus reads the data from the primary journal volume, and outputs the data to the network,
wherein the secondary storage apparatus writes the data received from the network to the secondary journal volume via a cache, and
wherein the secondary storage apparatus writes the data read from the secondary journal volume to the secondary volume via a cache,
the method comprising:
receiving, by the management system, a designation of at least one step selected from a first step of writing data to the secondary volume, a second step of writing data to the secondary journal volume, a third step of reading data from the primary journal volume, and a fourth step of transferring data by the network, and a designation of an analysis period;
acquiring, by the management system, history information of a load on a resource corresponding to the at least one selected step for the analysis period, and history information of a delay time related to a data replication conducted between the primary storage apparatus and the secondary storage apparatus for the analysis period; and
displaying, by the management system, a graph of the history information on the load and the history information of the delay time for the analysis period for the at least one selected step,
wherein the management system accepts, with respect to each of the first step to the fourth step, an input from a user on an analysis result,
wherein the management system estimates, from the analysis result inputted by the user, a cause for an increase of the delay time,
wherein the management system determines a measure to counter the estimated cause, and displays the measure with the estimated cause,
wherein when the first step is designated, the management system acquires history information of an operating rate of a processor included at the secondary storage apparatus, and history information of a write time delay probability for a cache included at the secondary storage apparatus,
wherein when the first step is designated, the management system displays in a single graph at least one of the history information of the operating rate and the history information of the write time delay probability, and the history information of the delay time, and
wherein when a plurality of steps are designated from the first step to the fourth step, and when the analysis period with respect to one of the plurality of designated steps is changed, the management system coordinates the analysis period for the plurality of steps to be the same as the changed analysis period for the one of the plurality of designated steps.

7. The method according to claim 6,
wherein when the second step is designated, the management system acquires history information of an operating rate of a processor included at the secondary storage apparatus, history information of a write time delay probability for a cache included at the secondary storage apparatus, and history information of a utilization rate of the secondary journal volume, and
wherein when the second step is designated, the management system displays in a single graph at least one of the history information of the operating rate, the history information of the write time delay probability, and the history information of the utilization rate, and the history information of the delay time.

8. The method according to claim 6,
wherein when the third step is designated, the management system acquires history information of an operating rate of a processor included at the primary storage apparatus, and history information of a utilization rate of the primary journal volume, and wherein when the third step is designated, the management system displays in a single graph at least one of the history information of the operating rate and the history information of the utilization rate, and the history information of the delay time.

9. The method according to claim 6, wherein when the fourth step is designated, the management system acquires history information of a transfer rate of data conducted via a remote path between the primary storage apparatus and the secondary storage apparatus, and history information of a data write transfer rate to the primary storage apparatus, and wherein when the fourth step is designated, the management system displays in a single graph at least one of the history information of the transfer rate by the remote path and the history information of the write transfer rate, and the history information of the delay time.

10. The method according to claim 6, wherein the management system displays, with respect to each of the first step to the fourth step, a graph indicating history information of a load on a resource and history information of a delay time.

* * * * *